US011131151B2

(12) United States Patent
Wood

(10) Patent No.: US 11,131,151 B2
(45) Date of Patent: Sep. 28, 2021

(54) TOOL COUPLER WITH SLIDING COUPLING MEMBERS FOR TOP DRIVE

(71) Applicant: Weatherford Technology Holdings, LLC, Houston, TX (US)

(72) Inventor: Kevin Wood, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 124 days.

(21) Appl. No.: 15/448,297

(22) Filed: Mar. 2, 2017

(65) Prior Publication Data

US 2018/0252050 A1 Sep. 6, 2018

(51) Int. Cl.
| | | |
|---|---|---|
| *E21B 17/04* | (2006.01) | |
| *E21B 3/03* | (2006.01) | |
| *F16L 37/23* | (2006.01) | |
| *F16D 7/00* | (2006.01) | |
| *E21B 17/03* | (2006.01) | |
| *E21B 3/02* | (2006.01) | |

(52) U.S. Cl.
CPC ............... *E21B 17/04* (2013.01); *E21B 3/02* (2013.01); *E21B 3/03* (2013.01); *E21B 17/03* (2013.01); *F16D 7/005* (2013.01); *F16L 37/23* (2013.01)

(58) Field of Classification Search
CPC .......... E21B 17/04; E21B 3/03; E21B 19/164; E21B 19/16; E21B 3/04; E21B 19/10; E21B 19/161; E21B 7/03; E21B 17/03; F16L 37/23; F16D 7/005
See application file for complete search history.

(56) References Cited

U.S. PATENT DOCUMENTS

| | | | | |
|---|---|---|---|---|
| 1,377,575 A | * | 5/1921 | Greve | ....................... E21B 3/02 173/199 |
| 1,822,444 A | | 9/1931 | MacClatchie | |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

Balltec Lifting Solutions, LiftLOK™ Brochure, "Highest integrity lifting tools for the harshest environments," 2 pages.

(Continued)

*Primary Examiner* — Hadi Shakeri
(74) *Attorney, Agent, or Firm* — Patterson + Sheridan, LLP

(57) ABSTRACT

Apparatus and methods are for coupling a drive unit to a tool adapter. A drive unit includes a drive stem; a plurality of sliding coupling members; a retainer; a torque profile; a plurality of drive stem ports; a coupling collar; coupling recesses; a plurality of transmission units; and/or first portions of a hydraulic coupling unit. A tool adapter includes a tool stem; a tool stem sleeve; coupling recesses; a torque profile; a plurality of sliding coupling members; and/or second portions of the hydraulic coupling unit. A method of coupling a drive unit to a tool adapter includes positioning the tool adapter below the drive unit; stabbing a drive stem into an interior of a tool stem sleeve; coupling torque between the drive unit and the tool adapter; and coupling load between the drive unit and the tool adapter by engaging a plurality of sliding coupling members.

12 Claims, 17 Drawing Sheets

(56) References Cited

U.S. PATENT DOCUMENTS

| | | |
|---|---|---|
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jurgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,967,477 A * | 10/1999 | Walmsley ............... E21B 19/06 248/230.2 |
| 5,971,079 A | 10/1999 | Mullins |
| 5,992,520 A | 11/1999 | Schultz et al. |
| 6,003,412 A | 12/1999 | Dlask et al. |
| 6,050,348 A * | 4/2000 | Richarson ............... E21B 7/068 175/26 |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Rosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |

(56) References Cited

U.S. PATENT DOCUMENTS

| | | | |
|---|---|---|---|
| 7,325,610 B2 | 2/2008 | Giroux et al. | |
| 7,353,880 B2 | 4/2008 | Pietras | |
| 7,448,456 B2 | 11/2008 | Shahin et al. | |
| 7,451,826 B2 | 11/2008 | Pietras | |
| 7,490,677 B2 | 2/2009 | Buytaert et al. | |
| 7,503,397 B2 | 3/2009 | Giroux et al. | |
| 7,509,722 B2 | 3/2009 | Shahin et al. | |
| 7,513,300 B2 | 4/2009 | Pietras et al. | |
| 7,552,764 B2 * | 6/2009 | Weems | B66C 1/42 166/75.14 |
| 7,591,304 B2 | 9/2009 | Juhasz et al. | |
| 7,617,866 B2 | 11/2009 | Pietras | |
| 7,635,026 B2 | 12/2009 | Mosing et al. | |
| 7,665,515 B2 | 2/2010 | Mullins | |
| 7,665,530 B2 | 2/2010 | Wells et al. | |
| 7,665,531 B2 * | 2/2010 | Pietras | E21B 19/06 166/380 |
| 7,669,662 B2 | 3/2010 | Pietras | |
| 7,690,422 B2 | 4/2010 | Swietlik et al. | |
| 7,694,730 B2 | 4/2010 | Angman | |
| 7,694,744 B2 | 4/2010 | Shahin | |
| 7,699,121 B2 | 4/2010 | Juhasz et al. | |
| 7,712,523 B2 | 5/2010 | Snider et al. | |
| 7,730,698 B1 | 6/2010 | Montano et al. | |
| 7,744,140 B2 * | 6/2010 | Rowley | F16B 7/025 294/94 |
| 7,757,759 B2 | 7/2010 | Jahn et al. | |
| 7,779,922 B1 | 8/2010 | Harris et al. | |
| 7,793,719 B2 | 9/2010 | Snider et al. | |
| 7,817,062 B1 | 10/2010 | Li et al. | |
| 7,828,085 B2 | 11/2010 | Kuttel et al. | |
| 7,841,415 B2 | 11/2010 | Winter | |
| 7,854,265 B2 | 12/2010 | Zimmermann | |
| 7,866,390 B2 | 1/2011 | Latiolais, Jr. et al. | |
| 7,874,352 B2 | 1/2011 | Odell, II et al. | |
| 7,874,361 B2 | 1/2011 | Mosing et al. | |
| 7,878,237 B2 | 2/2011 | Angman | |
| 7,878,254 B2 | 2/2011 | Abdollahi et al. | |
| 7,882,902 B2 | 2/2011 | Boutwell, Jr. | |
| 7,896,084 B2 | 3/2011 | Haugen | |
| 7,918,273 B2 | 4/2011 | Snider et al. | |
| 7,958,787 B2 | 6/2011 | Hunter | |
| 7,971,637 B2 | 7/2011 | Duhon et al. | |
| 7,975,768 B2 | 7/2011 | Fraser et al. | |
| 8,118,106 B2 | 2/2012 | Wiens et al. | |
| 8,141,642 B2 | 3/2012 | Olstad et al. | |
| 8,210,268 B2 | 7/2012 | Heidecke et al. | |
| 8,281,856 B2 | 10/2012 | Jahn et al. | |
| 8,307,903 B2 | 11/2012 | Redlinger et al. | |
| 8,365,834 B2 | 2/2013 | Liess et al. | |
| 8,459,361 B2 | 6/2013 | Leuchtenberg | |
| 8,505,984 B2 | 8/2013 | Henderson et al. | |
| 8,567,512 B2 | 10/2013 | Odell, II et al. | |
| 8,601,910 B2 | 12/2013 | Begnaud | |
| 8,636,067 B2 | 1/2014 | Robichaux et al. | |
| 8,651,175 B2 | 2/2014 | Fallen | |
| 8,668,003 B2 | 3/2014 | Osmundsen et al. | |
| 8,708,055 B2 | 4/2014 | Liess et al. | |
| 8,727,021 B2 | 5/2014 | Heidecke et al. | |
| 8,776,898 B2 | 7/2014 | Liess et al. | |
| 8,783,339 B2 | 7/2014 | Sinclair et al. | |
| 8,839,884 B2 | 9/2014 | Kuttel et al. | |
| 8,893,772 B2 | 11/2014 | Henderson et al. | |
| 9,068,406 B2 | 6/2015 | Clasen et al. | |
| 9,206,851 B2 | 12/2015 | Slaughter, Jr. et al. | |
| 9,631,438 B2 | 4/2017 | McKay | |
| 9,797,207 B2 * | 10/2017 | McIntosh | E21B 19/06 |
| 2002/0043403 A1 | 4/2002 | Juhasz et al. | |
| 2002/0047067 A1 | 4/2002 | Michel | |
| 2002/0074132 A1 | 6/2002 | Juhasz et al. | |
| 2002/0084069 A1 | 7/2002 | Mosing et al. | |
| 2002/0129934 A1 | 9/2002 | Mullins et al. | |
| 2002/0170720 A1 | 11/2002 | Haugen | |
| 2003/0098150 A1 | 5/2003 | Andreychuk | |
| 2003/0107260 A1 | 6/2003 | Ording et al. | |
| 2003/0221519 A1 | 12/2003 | Haugen | |
| 2004/0003490 A1 | 1/2004 | Shahin et al. | |
| 2004/0069497 A1 | 4/2004 | Jones et al. | |
| 2004/0216924 A1 | 11/2004 | Pietras et al. | |
| 2005/0000691 A1 | 1/2005 | Giroux et al. | |
| 2005/0173154 A1 | 8/2005 | Lesko | |
| 2005/0206163 A1 | 9/2005 | Guesnon et al. | |
| 2005/0257933 A1 * | 11/2005 | Pietras | E21B 19/07 166/380 |
| 2005/0269072 A1 | 12/2005 | Folk et al. | |
| 2005/0269104 A1 | 12/2005 | Folk et al. | |
| 2005/0269105 A1 | 12/2005 | Pietras | |
| 2005/0274508 A1 | 12/2005 | Folk et al. | |
| 2006/0037784 A1 | 2/2006 | Walter et al. | |
| 2006/0124353 A1 | 6/2006 | Juhasz et al. | |
| 2006/0151181 A1 | 7/2006 | Shahin | |
| 2006/0180315 A1 * | 8/2006 | Shahin | E21B 19/16 166/379 |
| 2007/0030167 A1 | 2/2007 | Li et al. | |
| 2007/0044973 A1 | 3/2007 | Fraser et al. | |
| 2007/0074588 A1 | 4/2007 | Harata et al. | |
| 2007/0074874 A1 | 4/2007 | Richardson | |
| 2007/0102992 A1 | 5/2007 | Jager | |
| 2007/0131416 A1 * | 6/2007 | Odell, II | E21B 19/06 166/250.1 |
| 2007/0140801 A1 | 6/2007 | Kuttel et al. | |
| 2007/0144730 A1 | 6/2007 | Shahin et al. | |
| 2007/0158076 A1 | 7/2007 | Hollingsworth, Jr. et al. | |
| 2007/0251701 A1 | 11/2007 | Jahn et al. | |
| 2008/0059073 A1 | 3/2008 | Giroux et al. | |
| 2008/0093127 A1 | 4/2008 | Angman | |
| 2008/0099196 A1 | 5/2008 | Latiolais et al. | |
| 2008/0125876 A1 | 5/2008 | Boutwell | |
| 2008/0202812 A1 | 8/2008 | Childers et al. | |
| 2008/0308281 A1 | 12/2008 | Boutwell, Jr. et al. | |
| 2009/0151934 A1 * | 6/2009 | Heidecke | E21B 3/02 166/250.01 |
| 2009/0159294 A1 | 6/2009 | Abdollahi et al. | |
| 2009/0200038 A1 | 8/2009 | Swietlik et al. | |
| 2009/0205820 A1 | 8/2009 | Koederitz et al. | |
| 2009/0205827 A1 | 8/2009 | Swietlik et al. | |
| 2009/0205836 A1 | 8/2009 | Swietlik et al. | |
| 2009/0205837 A1 | 8/2009 | Swietlik et al. | |
| 2009/0229837 A1 | 9/2009 | Wiens et al. | |
| 2009/0266532 A1 | 10/2009 | Revheim et al. | |
| 2009/0272537 A1 | 11/2009 | Alikin et al. | |
| 2009/0274544 A1 | 11/2009 | Liess | |
| 2009/0274545 A1 | 11/2009 | Liess et al. | |
| 2009/0321086 A1 | 12/2009 | Zimmermann | |
| 2010/0032162 A1 | 2/2010 | Olstad et al. | |
| 2010/0101805 A1 | 4/2010 | Angelle et al. | |
| 2010/0200222 A1 | 8/2010 | Robichaux et al. | |
| 2010/0206583 A1 | 8/2010 | Swietlik et al. | |
| 2010/0206584 A1 | 8/2010 | Clubb et al. | |
| 2011/0036586 A1 | 2/2011 | Hart et al. | |
| 2011/0039086 A1 | 2/2011 | Graham et al. | |
| 2011/0088495 A1 | 4/2011 | Buck et al. | |
| 2011/0214919 A1 | 9/2011 | McClung, III | |
| 2011/0280104 A1 | 11/2011 | McClung, III | |
| 2012/0048574 A1 | 3/2012 | Wiens et al. | |
| 2012/0152530 A1 | 6/2012 | Wiedecke et al. | |
| 2012/0160517 A1 | 6/2012 | Bouligny et al. | |
| 2012/0212326 A1 | 8/2012 | Christiansen et al. | |
| 2012/0234107 A1 | 9/2012 | Pindiprolu et al. | |
| 2012/0298376 A1 | 11/2012 | Twardowski | |
| 2013/0055858 A1 | 3/2013 | Richardson | |
| 2013/0056977 A1 * | 3/2013 | Henderson | E21B 17/046 285/325 |
| 2013/0062074 A1 | 3/2013 | Angelle et al. | |
| 2013/0075077 A1 | 3/2013 | Henderson et al. | |
| 2013/0075106 A1 | 3/2013 | Tran et al. | |
| 2013/0105178 A1 | 5/2013 | Pietras | |
| 2013/0207382 A1 | 8/2013 | Robichaux | |
| 2013/0207388 A1 | 8/2013 | Jansson et al. | |
| 2013/0233624 A1 | 9/2013 | In | |
| 2013/0269926 A1 | 10/2013 | Liess et al. | |
| 2013/0271576 A1 | 10/2013 | Elllis | |
| 2013/0275100 A1 | 10/2013 | Ellis et al. | |
| 2013/0299247 A1 | 11/2013 | Küttel et al. | |

(56) References Cited

U.S. PATENT DOCUMENTS

| | | |
|---|---|---|
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| EP | 0 250 072 A2 | 12/1987 |
| EP | 1 619 349 A2 | 1/2006 |
| EP | 1 772 715 A2 | 4/2007 |
| EP | 1961912 A1 | 8/2008 |
| EP | 1961913 A1 | 8/2008 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |

OTHER PUBLICATIONS

Balltec Lifting Solutions, CoilLOK™ Brochure, "Highest integrity hand-held coiled tubing handling tools," 2 pages.
EPO Partial European Search Report dated Jul. 31, 2018, for European Application No. 18159597.6.
EPO Extended European Search Report dated Nov. 6, 2018, for European Application No. 18159597.6.
EPO Extended European Search Report dated Mar. 30, 2020, for European Patent Application No. 19219841.4.
A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-Ton); 250H Hydraulic Top Drive (250-Ton); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.

(56) References Cited

OTHER PUBLICATIONS

PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.

* cited by examiner

TOOL COUPLER WITH SLIDING COUPLING MEMBERS FOR TOP DRIVE

BACKGROUND OF THE INVENTION

Embodiments of the present invention generally relate to equipment and methods for coupling a top drive to one or more tools. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

Safer, faster, more reliable, and more efficient connections that are capable of conveying load, data, signals, power and/or bi-directional torque between the tool string and the top drive are needed.

SUMMARY OF THE INVENTION

Embodiments generally relate to apparatus and methods for coupling a top drive to one or more tools. The coupling may transfer both axial load and torque bi-directionally from the top drive to the one or more tools.

In an embodiment, a top drive system includes a drive unit having a drive stem; a plurality of sliding coupling members disposed on an exterior of the drive stem; a retainer to retain the plurality of sliding coupling members on the drive stem; and a torque profile on the drive stem. The top drive system also includes a tool adapter having a tool stem having a tool stem sleeve, wherein the drive stem extends through an interior of the tool stem sleeve; a plurality of coupling recesses on an interior of the tool stem sleeve and engagable with the sliding coupling members; and a sleeve torque profile engagable with the torque profile.

In an embodiment, a method of coupling a drive unit to a tool adapter includes positioning the tool adapter below the drive unit; stabbing a drive stem of the drive unit into an interior of a tool stem sleeve of the tool adapter; coupling a torque between the drive unit and the tool adapter by engaging a torque profile of the drive stem with a sleeve torque profile of the tool stem sleeve; and coupling a load between the drive unit and the tool adapter by engaging a plurality of sliding coupling members on the drive stem with a plurality of coupling recesses on the interior of the tool stem sleeve.

In an embodiment, a drive unit of a top drive system includes a drive stem having a plurality of ports from an exterior thereof to an interior thereof; a plurality of sliding coupling members disposed in the ports; and a coupling collar encircling the drive stem and having actuation surfaces and recessed surfaces on an interior thereof, wherein the recessed surfaces align with the ports when the coupling collar is in a first position, and the actuation surfaces align with the ports when the coupling collar is in a second position.

In an embodiment, a method of coupling a drive unit to a tool adapter includes positioning the tool adapter below the drive unit; stabbing a tool stem of the tool adapter into an interior of a drive stem of the drive unit; engaging coupling recesses of the tool stem with sliding coupling members of the drive stem by moving the sliding coupling members to an extended position; and securing the sliding coupling members in the extended position.

In an embodiment, a drive unit of a top drive system includes a drive stem having a coupling recess; a plurality of ports in the drive stem connected to the coupling recess; a plurality of sliding coupling members movable between a retracted position and an extended position in the ports; and a plurality of vector transmission units operationally coupled to the sliding coupling members to move the sliding coupling members between the retracted position and the extended position.

In an embodiment, a method of coupling a drive unit to a tool adapter includes positioning the tool adapter below the drive unit; stabbing a tool stem of the tool adapter into an interior of a drive stem of the drive unit; mating a polygonal head of the tool stem with a coupling recess of the drive stem; and engaging coupling recesses of the tool stem with sliding coupling members of the drive stem by moving the sliding coupling members to an extended position.

In an embodiment, a top drive system includes a drive unit having a drive stem; a plurality of coupling recesses on an interior of the drive stem; a drive torque profile on the drive stem; and first portions of a hydraulic coupling unit; and a tool adapter having a tool stem, wherein the tool stem extends through an interior of the drive stem; a plurality of sliding coupling members disposed on an exterior of the tool stem and engagable with the coupling recesses on the drive stem; a tool torque profile on the tool stem and engagable with the drive torque profile; and second portions of the hydraulic coupling unit.

In an embodiment, a method of coupling a drive unit to a tool adapter includes positioning the tool adapter below the drive unit; stabbing a tool stem of the tool adapter into an interior of a drive stem of the drive unit; coupling a torque between the drive unit and the tool adapter by engaging a drive torque profile of the drive stem with a tool torque profile of the tool stem; and coupling a load between the drive unit and the tool adapter by: producing a control signal; responding to the control signal by moving sliding coupling members on the tool stem to an extended position; and engaging the sliding coupling members in the extended position with coupling recesses on the interior of the drive stem.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
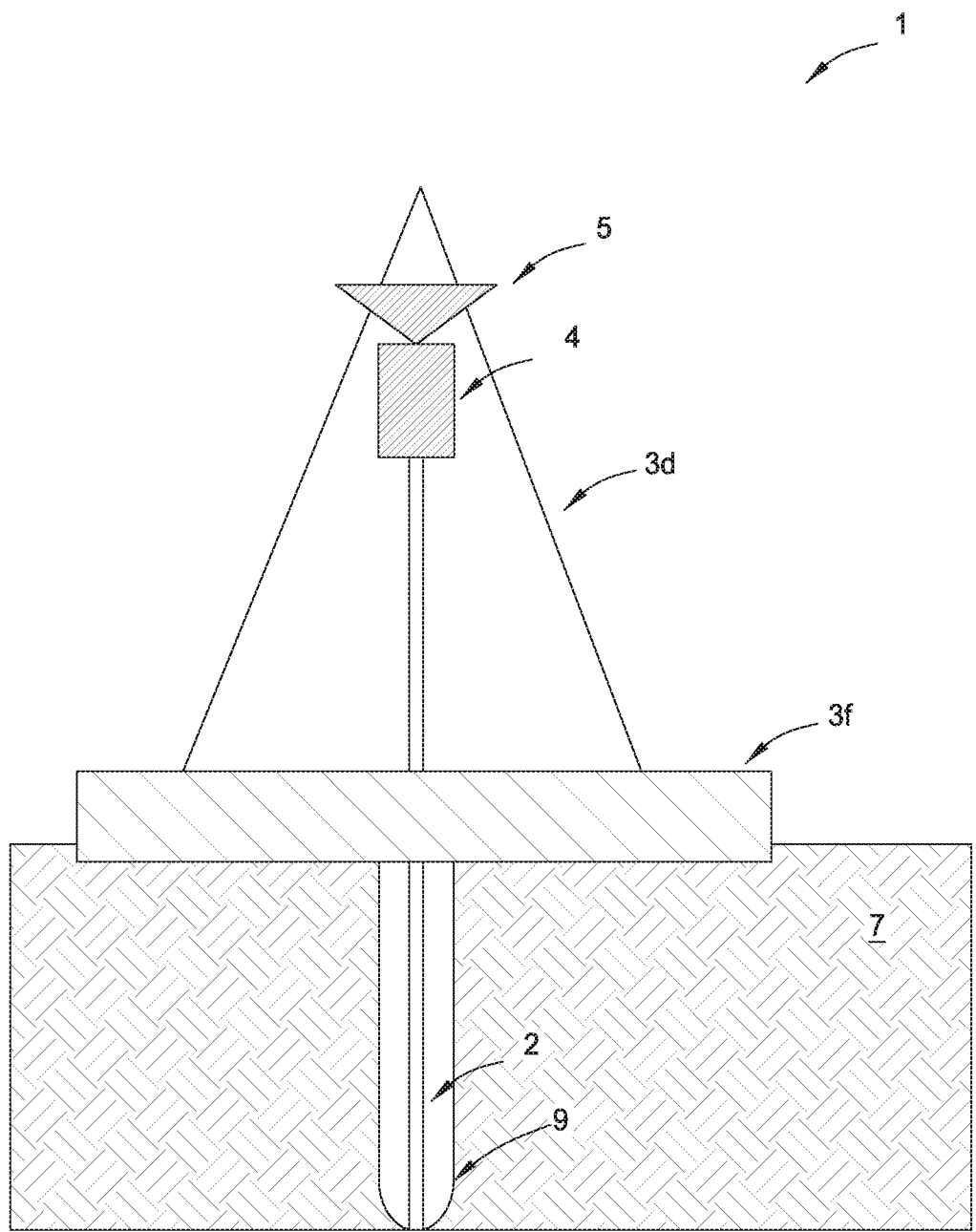
FIG. 1 illustrates a drilling system, according to embodiments of the present disclosure.

Embodiments provide apparatus and methods for coupling a top drive to one or more tools. The coupling may transfer torque bi-directionally from the top drive to the one or more tools. The coupling may provide at least one of mechanical, electrical, optical, hydraulic, and pneumatic connection. The coupling may convey at least one of torque, load, data, signals, and power. For example, axial loads of tool strings can be expected to be several hundred tons, up to, including, and sometimes surpassing 750 tons. Required torque transmission can be tens of thousands of foot-pounds, up to, including, and sometimes surpassing 100 thousand foot-pounds. Embodiments disclosed herein may provide axial connection integrity, capable to support at least one of high axial loads, good sealability, resistance to bending, high flow rates, and high flow pressures.

Some of the benefits provided by embodiments of this disclosure include a reliable method to transfer full bi-directional torque, thereby reducing the risk of accidental breakout of threaded connections along the tool string. Embodiments of this disclosure also provide a fast, hands-free method to connect and transfer power from the drive unit to the tool adapter. Embodiments provide automatic connection for power and data communications. Embodiments for quick tool change include at least one connection port for fluid and data transmission. Embodiments also provide axial load and torque transfer mechanisms necessary for oil rig operations. The connection process may be hands free and/or faster than the conventional tool changeover methods for top drives.

In some embodiments, sliding coupling members may use a compressive force, such as in a spring, to apply pressure so to hold a ball or nose nested in some sort of hole or other receptacle. Thus two or more elements of equipment can be aligned or fixed into a determined relative position. In some embodiments, sliding coupling members such as indexing plungers may have a beveled or rounded nose that inserts easily into an indexing receptacle. In some embodiments, indexing plungers may include features like cam action, lock-out or non lock-out types, threaded bodies, weldable mounting flanges, long knobs, plate mounts, ring or L-handles, etc. In some embodiments, sliding coupling members such as ball plungers may have a ball instead of a nose. The shallow depth of the ball may beneficially allow for easy movement in and out of position. In some embodiments, ball plungers may include push-fit styles, threaded bodies, slotted heads, etc. In some embodiments, sliding coupling members such as spring plungers may have a nose designed to allow for movement when a lateral force is applied. In some embodiments, hand-retractable spring plungers may include a knob for manual retraction of the plunger. In some embodiments, side thrust pins may fix parts and holding them in place with constant pressure. In some embodiments, quick release pins may consist of a rod or stem, from which small side securing pins may protrude. In some embodiments, a button in the handle may retract or extend these pins so that the quick release pin can be removed or secured in place. Sliding coupling members such as indexing, spring, and ball plungers, and their accessories, may also referred to as: spring loaded devices, detent pins, hand retractable pins, buspring loaded pins, bspring loaded pins, button handle pins, shackle pins, locating pins, indexing pins, retracting pins, spring loaded pins, receptacles and lanyards, rapid release pins, t-handle release pins, ball chains, self-locking rapid release pins, side thrust pins, thrust pins, spring loaded shells, ball buttons, spring loaded positioning elements, hand retractable spring plungers, lock-out spring plungers, non lock-out plungers, spacer bushings, and Clevis pins, In some embodiments, a threaded connection transfers axial load between the drive unit and the tool adapter. In some embodiments, the torque transfer path from the top drive system to the tool string bypasses the threaded connection between the drive unit and the tool adapter. This may allow full bi-directional torque to be applied in the tool string. In comparison, systems having torque transfer path through the threaded connections between the drive unit and the tool adapter risk backing out the main threaded connection while rotating in the breakout direction.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be connected to a tool string 2. At various times, top drive 4 may support the axial load of tool string 2. In some embodiments, the top drive 4 may be connected to the tool string 2 by threaded couplings. The rig floor 3f may have an opening through which the tool string 2 extends downwardly into a wellbore 9. At various times, rig floor 3f may support the axial load of tool string 2. During operation, top drive 4 may provide torque to tool string 2, for example to operate a drilling bit near the bottom of the wellbore 9. The tool string 2 may include joints of drill pipe connected together, such as by threaded couplings. At various times, top drive 4 may provide right hand (RH) torque or left hand (LH) torque to tool string 2, for example to make up or break out joints of drill pipe. Power and/or signals may be communicated between top drive 4 and tool string 2. For example, pneumatic, hydraulic, electrical, optical, or other power and/or signals may be communicated between top drive 4 and tool string 2. The top drive 4 may include a control unit, a drive unit, and a tool adapter. In some embodiments, the tool adapter may utilize threaded connections. In some embodiments, the tool adapter may be a combined multi-coupler (CMC) or quick connector to support load and transfer torque with couplings to transfer power (hydraulic, electric, data, and/or pneumatic).

Figure 2:
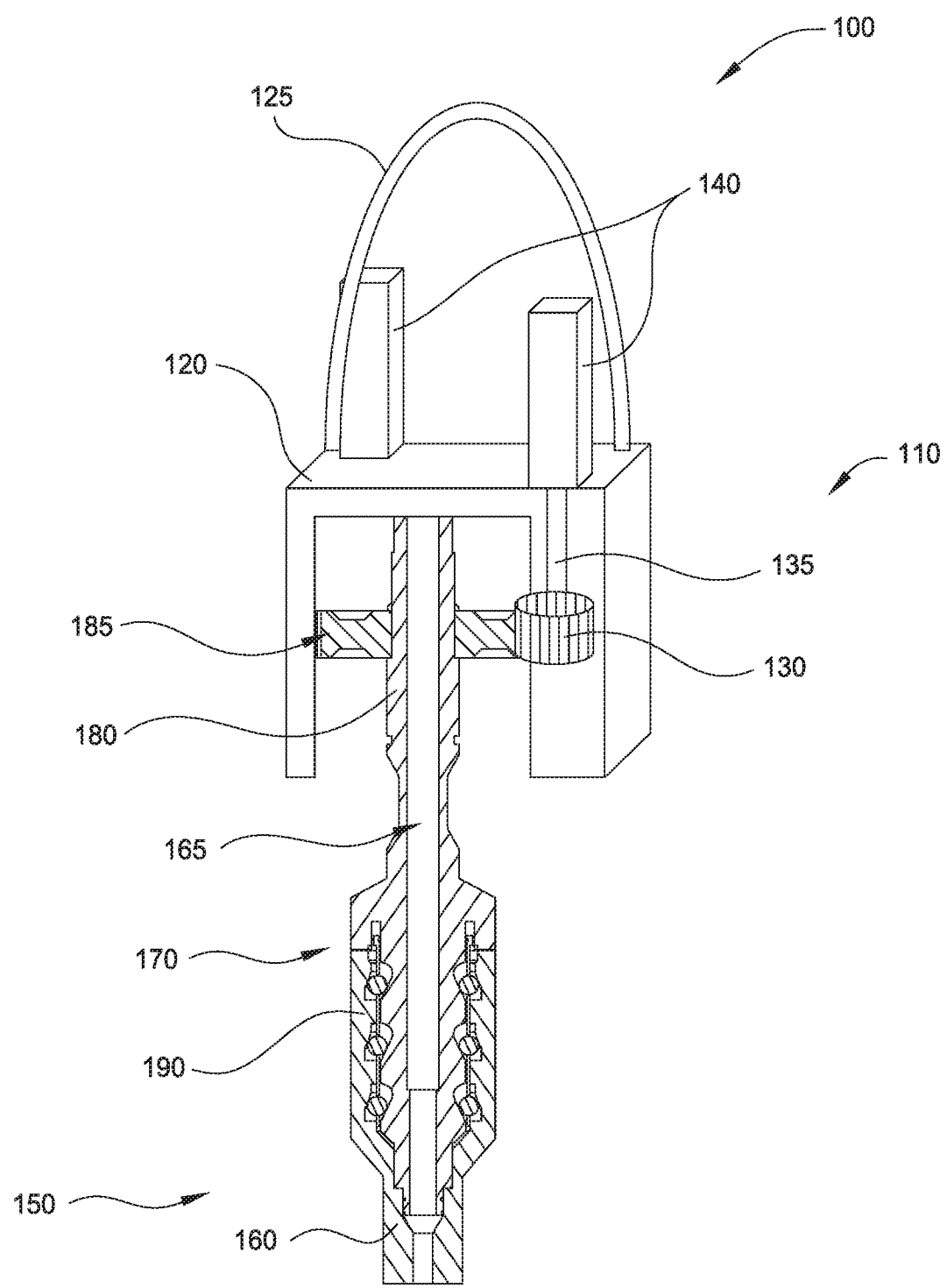
FIG. 2 illustrates a top drive system of the drilling system of FIG. 1.

FIG. 2 illustrates a top drive system 100 (e.g., top drive 4 in FIG. 1) according to embodiments described herein. Generally, top drive system 100 includes a drive unit 110 and a tool adapter 150. The drive unit 110 generally includes a housing 120, becket 125, drive gears 130, motors 140 (e.g., electric or hydraulic motors), first portions of one or more couplings 170, and a drive stem 180. Becket 125 may convey load from the top drive system 100 to the hoist 5. Becket 125 may be used with, or replaced by, other load-transfer components. Drive gears 130 may couple to motors 140 by way of shaft 135. Drive gears 130 may convey torque between the motors 140 and the drive stem 180. As illustrated, top drive system 100 includes two drive gears 130 (only one shown in FIG. 2) and two motors 140. Any number of drive gears 130 and/or motors 140 may be considered to accommodate manufacturing and operational conditions. The motors may be installed fixed to the housing 120. The tool adapter 150 generally includes a tool stem 160, a tool stem sleeve 190, and second portions of the couplings 170. Couplings 170 may include complementary components disposed in or on drive unit 110 and tool adapter 150. The drive stem 180 may extend through an interior of tool stem sleeve 190. The tool stem 160 generally remains below the drive unit 110. (It should be understood that "below", "above", "vertically", "up", "down", and similar terms as used herein refer to the general orientation of top drive 4 as illustrated in FIG. 1. In some instances, the orientation may vary somewhat, in response to various operational conditions. In any instance wherein the central axis of the top drive system is not aligned precisely with the direction of gravitational force, "below", "above", "vertically", "up", "down", and similar terms should be understood to be along the central axis of the top drive system.) The tool stem 160 connects the top drive system 100 to the tool string 2. The tool stem 160 and drive stem 180 may share a central bore 165 (e.g. providing fluid communication through the top drive system 100 to the tool string 2). Couplings 170 may include, for example, threaded couplings, hydraulic couplings, pneumatic couplings, electronic couplings, fiber optic couplings, power couplings, data couplings, and/or signal couplings. When the drive unit 110 is coupled to the tool adapter 150, top drive system 100 may transfer bi-directional torque, load, power, data, and/or signals between the top drive and the tool.

Figures 3A, 3B:
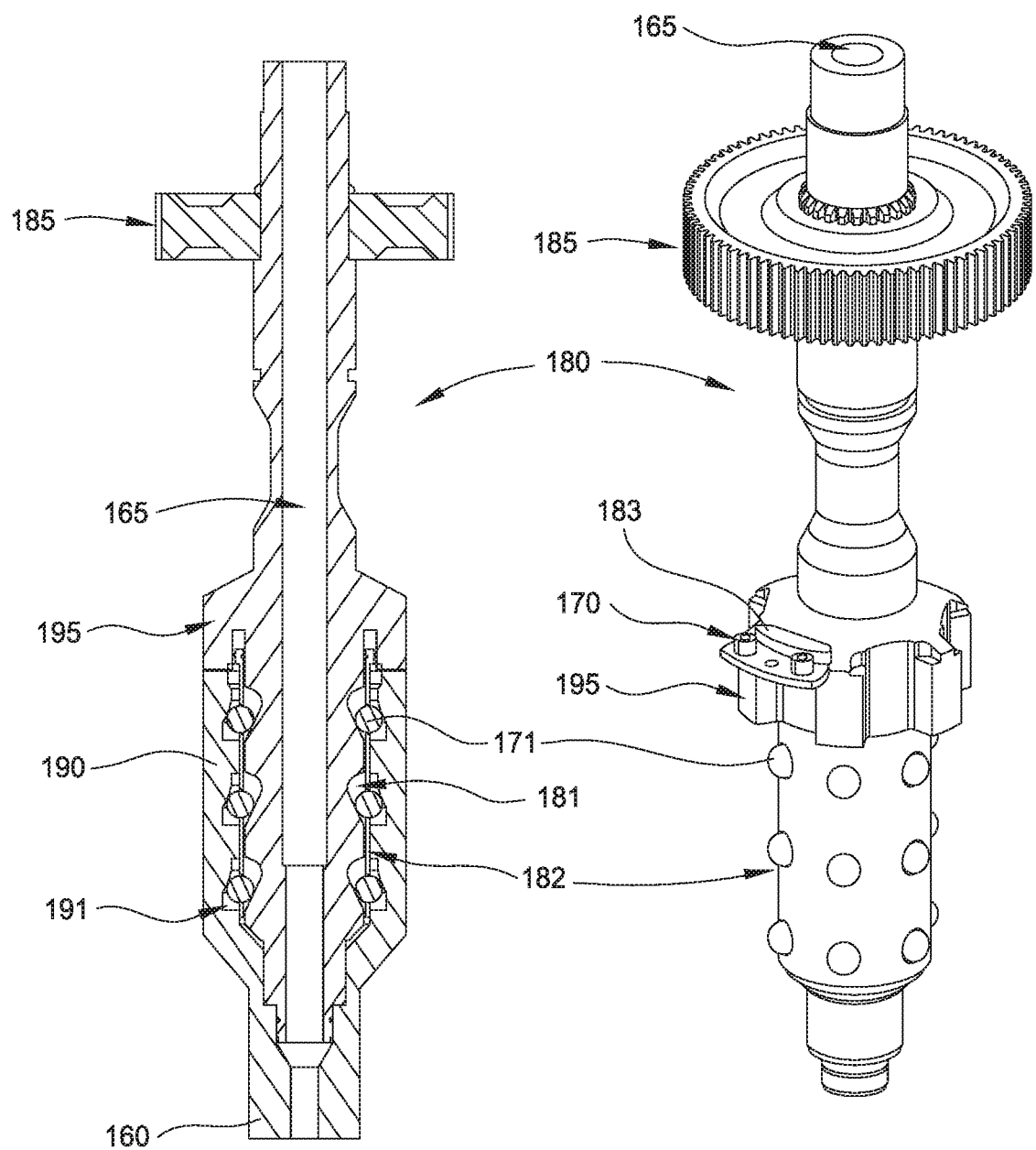
FIGS. 3A-3B illustrate a drive stem and a tool stem of the top drive system of FIG. 2.

As illustrated in FIGS. 3A-3B, drive stem 180 may have a drive gear profile 185 and torque profile 195. Drive gears 130 (FIG. 2) may engage drive stem 180 at drive gear profile 185. Motors 140 may turn shaft 135, which turns drive gears 130, thereby turning drive gear profile 185 and drive stem 180. Drive gear profile 185 may have teeth designed to mesh with the gearing of drive gears 130. Alternatively, drive gears 130 and/or drive gear profile 185 may be configured to engage belt drive, chain drive, or other systems that are capable of conveying rotation. Drive gear profile 185 may be located near the top of drive stem 180. Torque profile 195 may be an axially symmetrical or axially non-symmetrical profile capable of conveying torque around central bore 165. For example, torque profile 195 may be a plurality (e.g., two, three, four, five, six, etc.) of lugs distributed axially symmetrically around central bore 165. In some embodiments, the torque profile 195 may have a radial extent at least as wide as tool stem sleeve 190. In the illustrated embodiment, torque profile 195 is disposed on drive stem 180 above portions thereof which fit into tool stem sleeve 190. The radial extent of torque profile 195 may be selected to accommodate manufacturing and operational conditions. For example, a larger radial extent of torque profile 195 may provide for a larger lever-arm, thereby conveying greater torque at the same rotational speed.

Also illustrated in FIGS. 3A-3B, drive stem 180 may have sliding coupling members 171. As used herein, unless explicitly stated otherwise, "sliding" should be understood to convey translational motion, including translational motion with rotation. In some embodiments, sliding coupling members may be spherical, ellipsoidal, or otherwise rounded. In some embodiments, sliding coupling members may have exterior shapes such as rectangular solids, polygonal solids, or other exterior shapes having angles. In some embodiments, sliding coupling members may have one or more areas of concavity on exterior surfaces thereof. Sliding coupling members 171 may be distributed axially symmetrically or axially non-symmetrically on an exterior of drive stem 180. Sliding coupling members 171 may be distributed symmetrically or non-symmetrically along an axial length of the exterior of drive stem 180. Sliding coupling members 171 may be movable at least partially into and out of coupling recesses 181 on drive stem 180. In some embodiments, coupling recesses 181 are smoothly curved, concave features. It is currently believed that features with smooth curvature may be less susceptible to stress forces than features having angles, jags, or other discontinuities. The sliding coupling members 171 may be sized and shaped identically, similarly, or non-similarly. Each coupling recess 181 may be sized and shaped to allow its respective sliding coupling member 171 to move at least partially into and out of the coupling recess 181. Retainer 182 may retain sliding coupling members 171 in coupling recesses 181 on drive stem 180. For example, retainer 182 may be a sleeve encircling drive stem 180 and having ports distributed similarly to the coupling recesses 181 on drive stem 180. Each of the ports of retainer 182 may be not as large as the largest spatial dimension of its respective sliding coupling member 171. For example, when sliding coupling members 171 are spherical, each port of retainer 182 may have a cross-sectional diameter smaller than the diameter of the respective sliding coupling member 171. In some embodiments, retainer 182 may include a plurality of retainers that collectively retain all of the sliding coupling members 171 in coupling recesses 181.

Also illustrated in FIG. 3A, tool stem sleeve 190 may have coupling recesses 191 on an interior surface thereof. Coupling recesses 191 may be distributed, sized, and shaped so that sliding coupling members 171 may at least partially move into and out of coupling recesses 191 of tool stem sleeve 190 when drive stem 180 extends through the interior of tool stem sleeve 190. In some embodiments, recesses 191 are smoothly curved, concave features. It is currently believed that features with smooth curvature may be less susceptible to stress forces than features having angles, jags, or other discontinuities.

As would be understood by one of ordinary skill in the art with the benefit of this disclosure, drive stem 180 may support the axial load of tool string 2 by coupling to tool stem 160 with sliding coupling members 171. Therefore, the number and sizing of sliding coupling members 171 (and, therefore, the number and sizing of coupling recesses 181, coupling recesses 191, and ports of retainer 182) may be selected to support the expected axial load. For the same sizing, an increased number of sliding coupling members 171 may be desired to support an increased expected axial load. For the same number, an increased sizing of sliding coupling members 171 may be desired to support an increased expected axial load.

Figure 4:
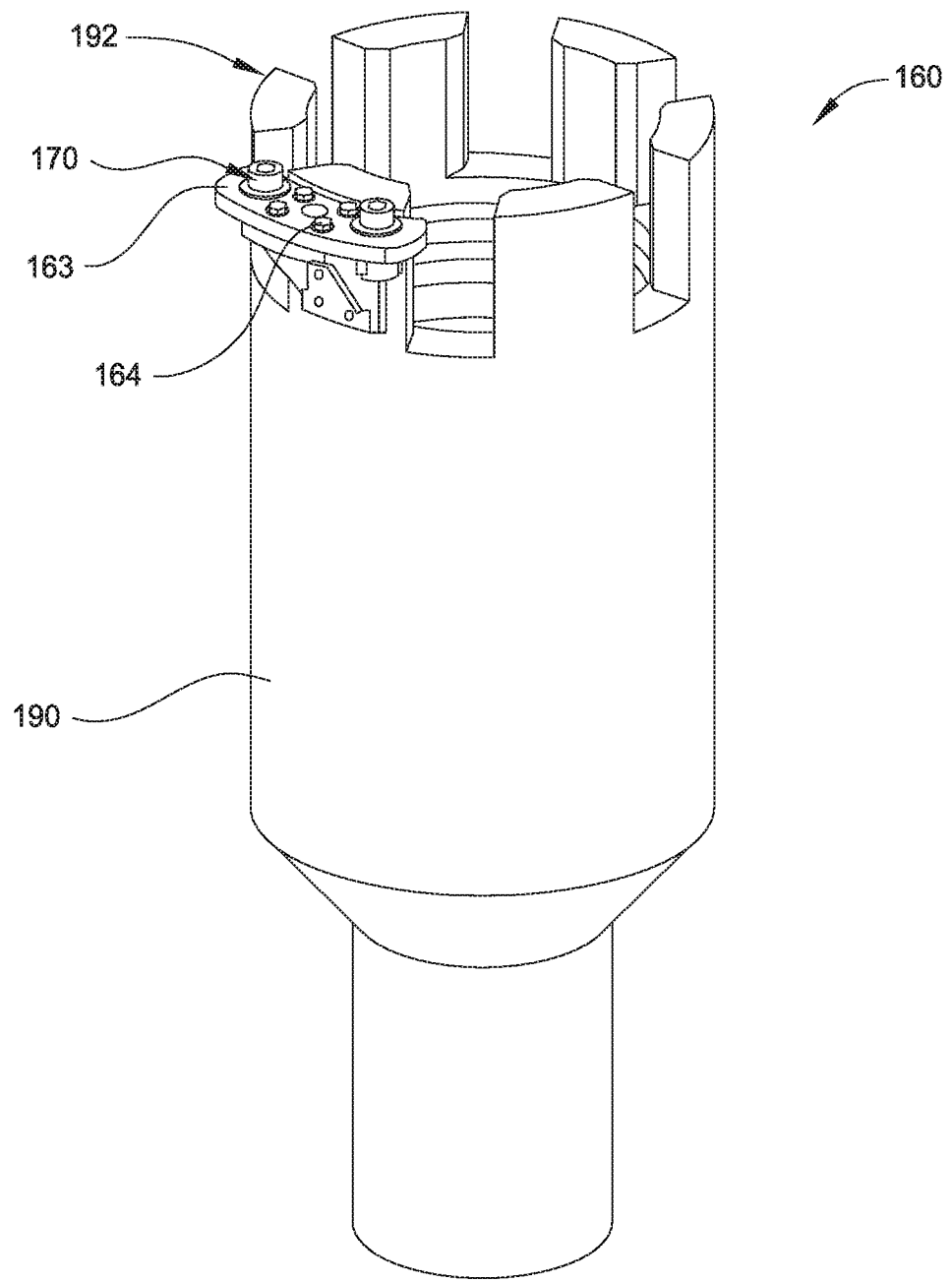
FIG. 4 further illustrates the tool stem of the top drive system of FIG. 2.

As illustrated in FIG. 4, tool stem sleeve 190 may include a sleeve torque profile 192. Sleeve torque profile 192 may be configured to engage and/or mate with torque profile 195 of drive stem 180. Sleeve torque profile 192 may be an axially symmetrical or axially non-symmetrical profile capable of conveying torque around central bore 165. For example, sleeve torque profile 192 may be a plurality (e.g., two, three, four, five, six, etc.) of lugs distributed axially symmetrically around central bore 165. In some embodiments, the sleeve torque profile 192 may have a radial extent at least as wide as torque profile 195. Sleeve torque profile 192 may engage torque profile 195 when drive stem 180 extends through the interior of tool stem sleeve 190 to couple drive unit 110 to tool adapter 150. For example, drive stem 180 may turn torque profile 195, which engages sleeve torque profile 192, thereby turning tool stem sleeve 190 of tool stem 160.

As illustrated in FIG. 3B and FIG. 4, drive stem 180 and tool stem 160 may have complementary couplings 170. For example, drive stem 180 may have a coupling bracket 183 near torque profile 195 for securing first portions of couplings 170, and tool stem 160 may have a coupling bracket 163 near sleeve torque profile 192 for securing second portions of couplings 170. In some embodiments, multiple coupling bracket pairs 163/183 may be utilized to provide for multiple couplings 170, multiple tools, multiple orientations of drive stem 180 and tool stem 160, and/or redundancy. Couplings 170 may include, for example, hydraulic couplings, pneumatic couplings, electronic couplings, fiber optic couplings, power couplings, data couplings, and/or signal couplings. When the drive unit 110 is coupled to the tool adapter 150, couplings 170 may transfer power, data, and/or signals between the top drive and the tool. The couplings 170 may be quick-connect couplings. The coupling brackets 163/183 may allow for lateral motion to accommodate small misalignments during coupling, vibrations during operations, etc. In some embodiments, coupling bracket 163 on tool stem 160 may also mate with a coupling bracket on a tool storage rack. When on the storage rack, the tool stem 160 may thereby interface with battery recharging systems, data download systems, programming systems, hydraulic maintenance systems, etc.

Figure 5:
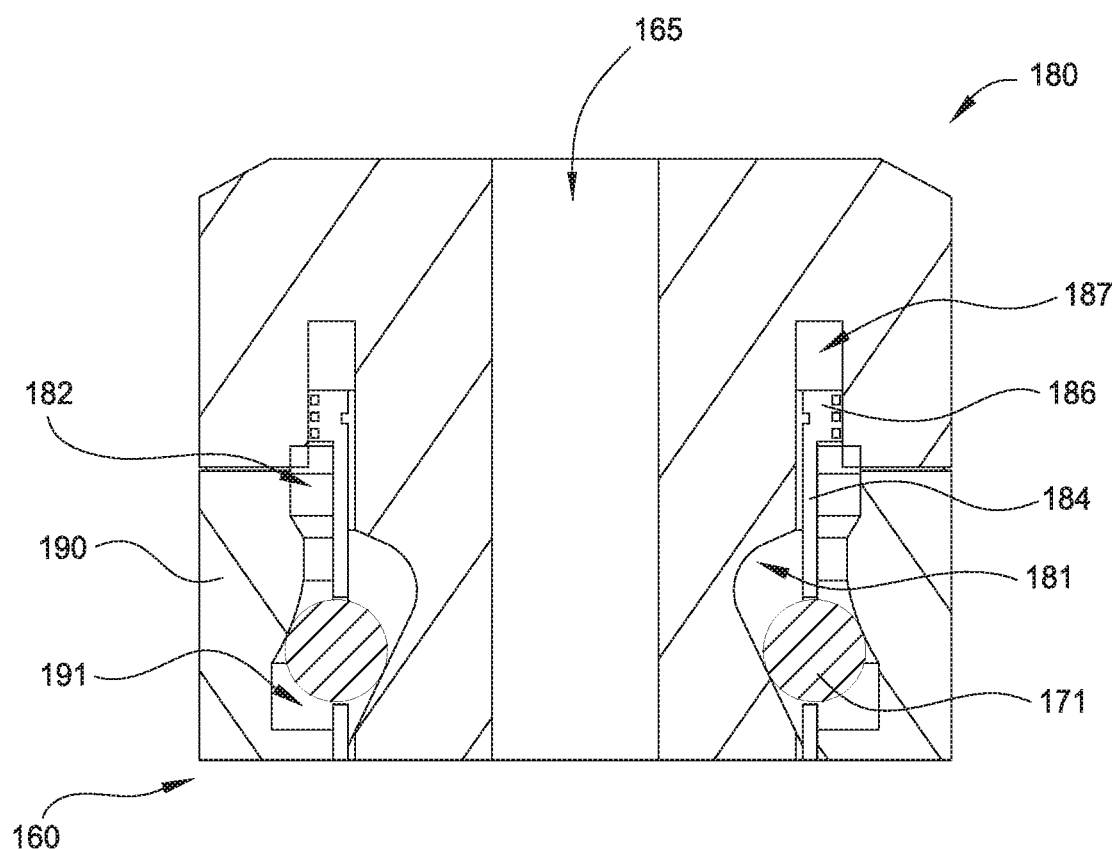
FIG. 5 further illustrates the drive stem and the tool stem of the top drive system of FIG. 2.

FIG. 5 further illustrates features of sliding coupling members 171 and retainer 182. In some embodiments, retainer 182 may include one or more pistons 186 (e.g., hydraulic pistons) disposed in recess(es) 187 of drive stem 180. In the illustrated embodiment, retainer 182 includes a sleeve 184 encircling drive stem 180 and connected to piston(s) 186. Piston 186 may move between an upper position and a lower position in recess 187. As illustrated, when piston 186 is in the upper position, sleeve 184 causes sliding coupling members 171 to be in a retracted position in coupling recesses 181 of drive stem 180. As illustrated, when piston 186 is in the lower position, sleeve 184 causes sliding coupling members 171 to be in an extended position in coupling recesses 181 of drive stem 180, thereby extending sliding coupling members 171 into coupling recesses 191 of tool stem sleeve 190. It should be appreciated that other configurations of pistons, sleeves, sliding coupling members, and/or coupling recesses may be considered to accommodate manufacturing and operational conditions. When sliding coupling members 171 are in the extended position, axial load may be transferred from tool stem 160 through tool stem sleeve 190, to sliding coupling members 171, to drive stem 180, and thereby to drive unit 110. In some embodiments, drive stem 180 may include a locking feature (not shown) to secure sliding coupling members 171 in the extended position. For example, the locking feature may secure piston 186 in the lower position. The locking feature may be configured to provide an external visual representation of whether the sliding coupling members 171 are secured in the extended position. In some embodiments, drive stem 180 may include an actuator (not shown) to move piston 186 between the upper position and the lower position. For example, the actuator may be manual, hydraulic, pneumatic, electrical, etc. In some embodiments, the actuator may provide an external visual representation of the position of the piston 186. In some embodiments, the locking feature may be operationally coupled to the actuator, thereby securing the sliding coupling members 171 by securing the piston 186.

Drive unit 110 may be coupled to tool adapter 150 in order to transfer bi-directional torque, load, power, data, and/or signals between the top drive and the tool. Coupling of drive unit 110 to tool adapter 150 may proceed as a multi-step process. In one embodiment, the coupling begins with torque coupling between drive stem 180 and tool stem 160. Tool stem 160 may be oriented and/or aligned below drive stem 180. Tool stem 160 may be oriented so that sleeve torque profile 192 aligns with torque profile 195. Drive stem 180 may be stabbed into the interior of tool stem sleeve 190. Tool stem 160 may be raised relative to drive stem 180

(and/or drive stem 180 may be lowered relative to tool stem 160) so that sleeve torque profile 192 fully mates with and/or engages torque profile 195. The sleeve torque profile 192 and/or the torque profile 195 may have guiding chamfers. It should be appreciated that other torque coupling types and/or configurations may be considered to accommodate manufacturing and operational conditions. Once sleeve torque profile 192 is mated with torque profile 195, bi-directional torque may be transferred between the top drive and the tool. For example, torque may be transferred from the motors 140 to the drive gears 130, through the drive gear profiles 185 to the drive stem 180, through the torque profiles 195 to the sleeve torque profile 192, to the tool stem sleeve 190 of the tool stem 160, and thus to the tool string 2. When tool stem 160 is coupled to drive stem 180, as shown in FIG. 2, bi-directional torque may be transferred between the top drive and the tool. Likewise, when tool stem 160 is coupled to drive stem 180, central bore 165 may provide fluid communication between the top drive and the tool.

Coupling of drive unit 110 to tool adapter 150 may proceed with axial load coupling between drive stem 180 and tool stem 160. With drive stem 180 extended through an interior of tool stem sleeve 190, and with sleeve torque profile 192 mated with torque profile 195, coupling recesses 181 on drive stem 180 may be aligned with coupling recesses 191 on tool stem sleeve 190 so that sliding coupling members 171 may move therebetween. Sliding coupling members 171 may move to an extended position in coupling recesses 181 of drive stem 180, and thus into coupling recesses 191 of tool stem sleeve 190. For example, piston 186 may move to the lower position, thereby moving sleeve 184 to cause sliding coupling members 171 to be in the extended position. In some embodiments, an actuator may move piston 186 to the lower position. In some embodiments, a locking feature may secure sliding coupling members 171 in the extended position. In some embodiments, the locking feature may secure piston 186 in the lower position. When sliding coupling members 171 are in the extended position, axial load may be transferred from tool stem 160 through tool stem sleeve 190, to sliding coupling members 171, to drive stem 180, and thereby to drive unit 110.

In some embodiments, coupling drive stem 180 to tool stem 160 may be facilitated with various sensors, actuators, couplers, and/or adapters. For example, drive stem 180 may be first oriented relative to tool stem 160 so that sleeve torque profile 192 aligns with torque profile 195. A sensor (e.g., an optical sensor) may be disposed at the base of drive stem 180. The sensor may be configured to detect a marker (e.g., a reflector) disposed at the top of tool stem 160. Drive stem 180 may be rotated relative to tool stem 160 until the sensor detects alignment with the marker. For example, motors 140 may rotate drive stem 180 to align sleeve torque profile 192 with torque profile 195. In some embodiments, multiple markers may be utilized. For example, drive stem 180 may be appropriately oriented in two or more orientations relative to tool stem 160. The sensor need only detect alignment with the first marker to identify appropriate orientation of drive stem 180 relative to tool stem 160. As another example, sensors 164 may be disposed on coupling bracket 163 (FIG. 4). Sensors 164 may detect a marker associated with coupling bracket 183. Orientation and alignment of couplings 170 between coupling bracket 163 and coupling bracket 183 may be detected by sensors 164. Orientation and/or alignment of drive stem 180 with tool stem 160 may be corrected to better mate first portions of couplings 170 on drive stem 180 with second portions of couplings 170 on tool stem 160. It should be appreciated that other sensors, actuators, and/or adapters types and/or configurations may be considered to accommodate manufacturing and operational conditions.

Figure 6:
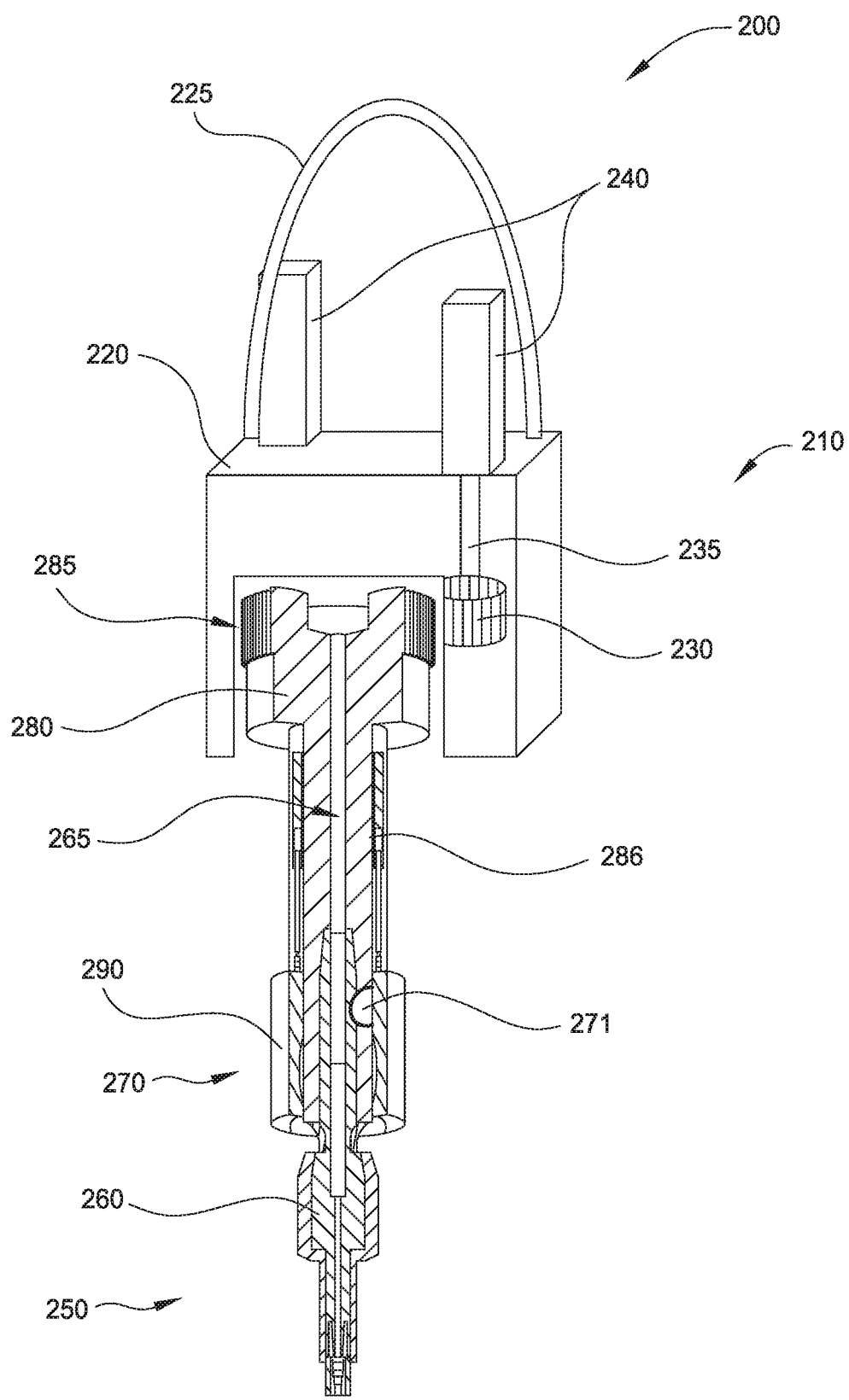
FIG. 6 illustrates an alternative top drive system of the drilling system of FIG. 1.

FIG. 6 illustrates an alternative top drive system 200 according to embodiments described herein. Except as noted, top drive system 200 is configured and functions similarly to top drive system 100. For example, top drive system 200 includes a drive unit 210 and a tool adapter 250. The drive unit 210 generally includes a housing 220, becket 225, drive gears 230, motors 240, first portions of one or more couplings 270, and a drive stem 280. Sliding coupling members 271 may be disposed on drive stem 280. Rather than tool stem sleeve 190, drive unit 210 includes a coupling collar 290. Rather than pistons 186, drive unit 210 includes actuators 286 (e.g., hydraulic cylinders) operationally coupled to the coupling collar 290. Actuators 286 may be distributed about drive stem 280. As illustrated, four actuators are symmetrically distributed about drive stem 280, but the number and distribution may vary to accommodate manufacturing and operational conditions. The drive stem 280 may extend through an interior of coupling collar 290. In some embodiments, the actuators 286 may be fixed relative to the drive stem 280. The tool adapter 250 generally includes a tool stem 260 and second portions of the couplings 270. The tool stem 260 connects the top drive system 200 to the tool string 2. The tool stem 260 and drive stem 280 may share a central bore 265. When the drive unit 210 is coupled to the tool adapter 250, top drive system 200 may transfer bi-directional torque, load, power, data, and/or signals between the top drive and the tool.

Figure 7:
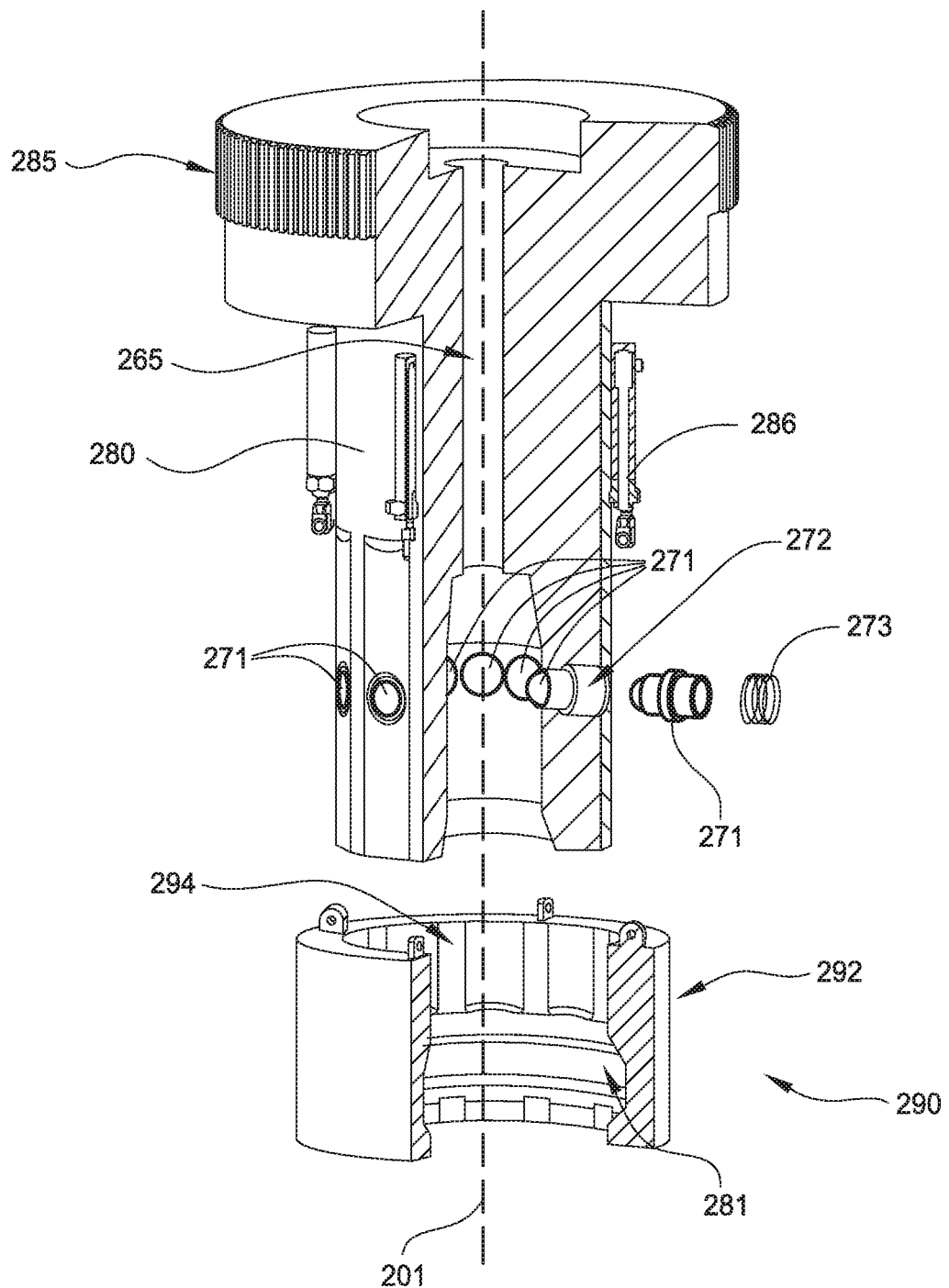
FIG. 7 illustrates a drive stem of the top drive system of FIG. 6.

As illustrated in FIG. 7, coupling collar 290 generally includes a sleeve 292, recessed surfaces 281 on an interior of the sleeve 292, and actuation surfaces 294 on an interior of sleeve 292. The drive stem 280 may extend through an interior of sleeve 292. Drive stem 280 and coupling collar 290 may share a central axis 201. Recessed surfaces 281 may be concave features on the interior surface of sleeve 292. Actuation surfaces 294 may be flat or convex features on the interior surface of sleeve 292. In some embodiments, the radial depth of recessed surfaces 281 (measured from the central axis 201) may be constant around central axis 201. In some embodiments, the radial depth of recessed surfaces 281 may vary around central axis 201. Recessed surfaces 281 may be below actuation surfaces 294 on the interior surface of sleeve 292. In some embodiments, the radial depth of actuation surfaces 294 may be constant around central axis 201. In some embodiments, the radial depth of actuation surfaces 294 may vary around central axis 201. At each angle around central axis 201, the radial depth of recessed surfaces 281 may be equal to or greater than the radial depth of actuation surfaces 294. Coupling collar 290 may move vertically relative to drive stem 280. Coupling collar 290 may be operationally connected to actuators 286. Actuators 286 may move coupling collar 290 vertically relative to drive stem 280.

Figure 10:
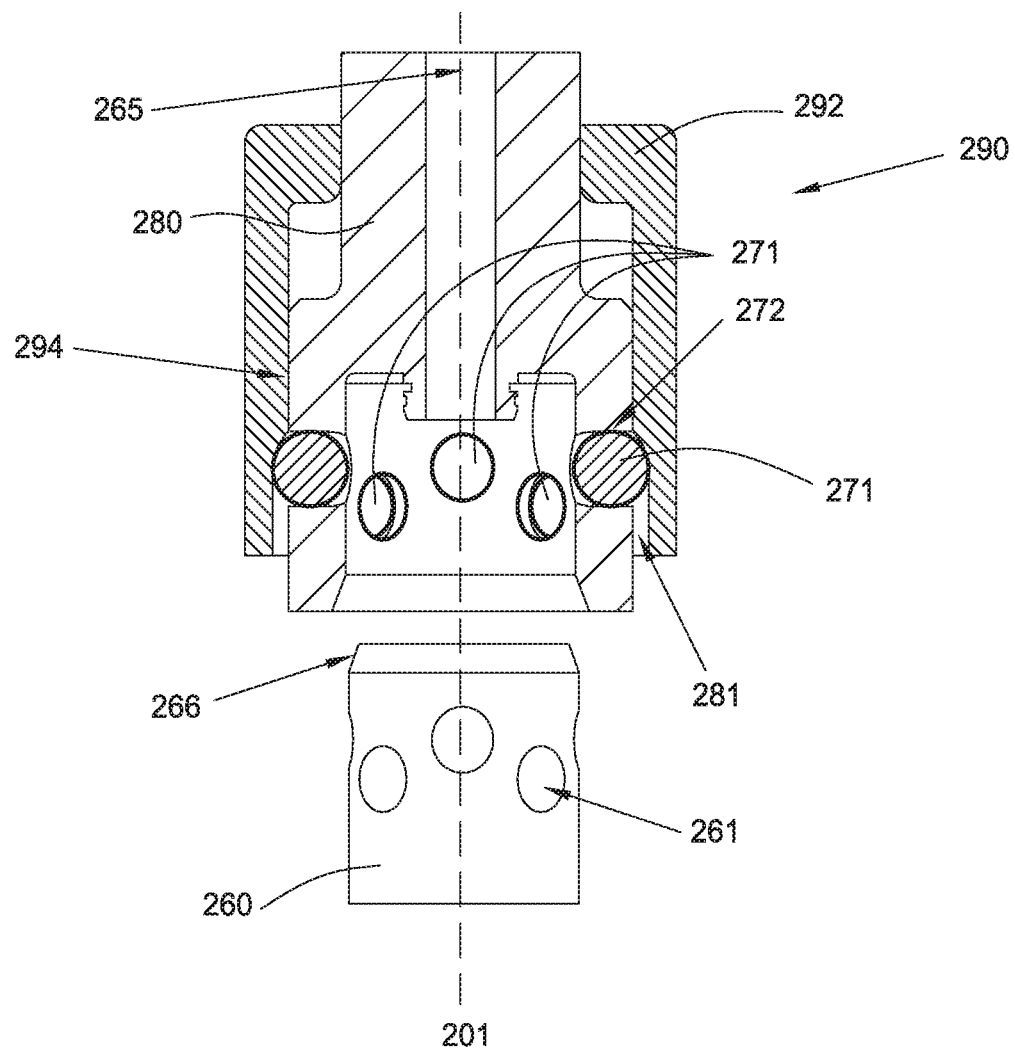
FIG. 10 illustrates an alternative drive stem and tool stem of the top drive system of FIG. 6.

Also illustrated in FIG. 7, sliding coupling members 271 may be disposed on drive stem 280. Ports 272 may extend from an exterior surface of drive stem 280 to the interior of drive stem 280. Sliding coupling members 271 may be disposed in the ports 272. Although illustrated in FIG. 7 as a single, symmetrical row of ten ports 272, other distributions, quantity, and configurations of ports 272 may be considered to accommodate manufacturing and operational conditions. For example, FIG. 10 illustrates an embodiment with two interleaved rows of ports 272. Ports 272 may be sized and shaped to allow sliding coupling members 271 to partially extend into the interior of drive stem 280. Ports 272 may be sized and shaped to prevent sliding coupling members 271 from fully entering into the interior of drive stem 280. When assembled, spring elements 273 may be disposed between sliding coupling members 271 and sleeve 292. Spring elements 273 may provide a force on sliding coupling members 271 towards central axis 201. In some embodiments, spring elements 273 may be compressible devices (e.g., springs). As illustrated in FIG. 7, sliding coupling members 271 are cylindrical pins having a spherical end (towards central axis 201) and a flat, chamfered end (towards spring element 273). As with sliding coupling members 171, other shapes of sliding coupling members 271 may be considered to accommodate manufacturing and operational conditions. For example, as illustrated in FIG. 10, sliding coupling members 271 may be spherical. In some embodiments, spherically shaped sliding coupling members 271 may be utilized without spring elements 273.

Figure 8:
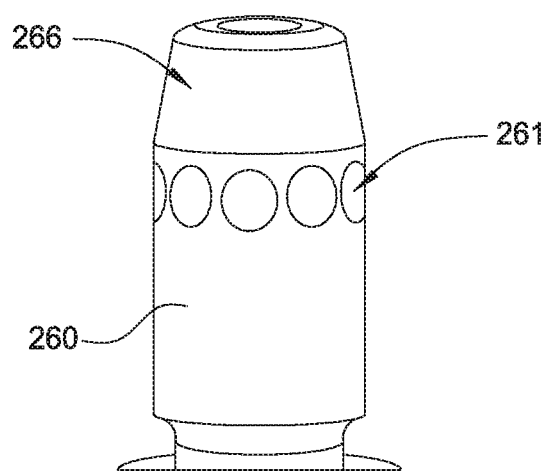
FIG. 8 illustrates a tool stem of the top drive system of FIG. 6.

FIG. 8 further illustrates tool stem 260. Tool stem 260 may have coupling recesses 261 disposed on an exterior surface thereof. Coupling recesses 261 may be concave features on the exterior surface of tool stem 260. Coupling recesses 261 may be sized and distributed to align with ports 272 on drive stem 280 when the drive stem 280 is coupled to the tool stem 260. In some embodiments, to provide for ease of alignment of ports 272 with coupling recesses 261, ports 272 may be closely spaced on drive stem 280, and coupling recesses 261 may be likewise closely spaced on tool stem 260. In some embodiments, to provide for ease of alignment, the number of coupling recesses 261 may exceed the number of ports 272 (e.g., twice as many coupling recesses 261 as ports 272). Tool stem 260 may have a tapered top end 266 that is narrower at the top and widens towards coupling recesses 261.

Figure 9A:
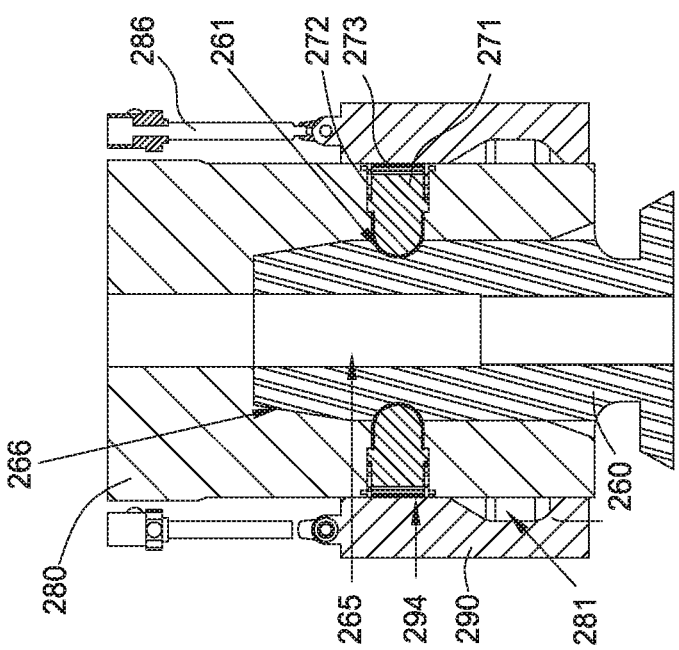
FIGS. 9A-9C illustrate a method of coupling the drive unit of FIG. 6 with the tool adapter of FIG. 6.

As before, coupling of drive unit 210 to tool adapter 250 may proceed as a multi-step process. In one embodiment, illustrated in FIG. 9A, drive stem 280 may be aligned with tool stem 260 so that tool stem 260 may be stabbed into an interior of drive stem 280. Drive stem 280 may rotate relative to tool stem 260 so that coupling recesses 261 on tool stem 260 may align with ports 272 drive stem 280. It should be understood that rotation of drive stem 280 relative to tool stem 260 may not be necessary. For example, sufficient number and/or distribution of coupling recesses 261 may provide a self-aligning functionality. Actuators 286 may hold coupling collar 290 in a raised position on drive stem 280 while aligning coupling recesses 261 with ports 272 and/or stabbing tool stem 260 into an interior of drive stem 280. With coupling collar 290 in the raised position, recessed surfaces 281 may align with ports 272 so that spring elements 273 are at least partially disposed in recessed surfaces 281. In other words, with coupling collar 290 in the raised position, recessed surfaces 281 may be in vertical alignment with ports 272.

Figure 9B:
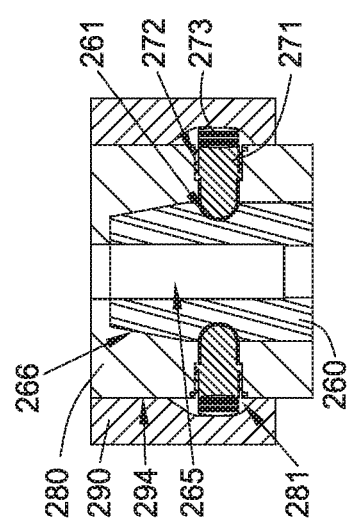

Coupling of drive unit 210 to tool adapter 250 may proceed as illustrated in FIG. 9B. As tool stem 260 is stabbed into an interior of drive stem 280, tapered top end 266 of tool stem 260 may engage with an interior end (towards central axis 201) of sliding coupling members 271. The tapered top end 266 may press against sliding coupling members 271, resisting and/or overcoming the force of spring elements 273. Sliding coupling members 271 may thereby slide outwardly (away from central axis 201) through ports 272. Sliding coupling members 271 may slide outwardly to a retracted position, retracted from the interior of drive stem 280. As tool stem 260 moves upwardly relative to drive stem 280, tapered top end 266 may continue to slide sliding coupling members 271 outwardly until coupling recesses 261 of tool stem 260 are vertically aligned with ports 272. Once coupling recesses 261 are in vertical alignment with ports 272, sliding coupling members 271 may slide inwardly (towards central axis 201) to mate with coupling recesses 261. Sliding coupling members 271 may thereby be in an extended position, extending into the interior of drive stem 280 from ports 272. Tapered top end 266 may engage a shoulder or other stop surface of drive stem 280 when coupling recesses 261 of tool stem 260 are vertically aligned with ports 272. When sliding coupling members 271 are in the extended position and/or are mated with coupling recesses 261, axial load may be transferred from tool stem 260 through coupling recesses 261, to sliding coupling members 271, to ports 272 and drive stem 280, and thereby to drive unit 210.

Figure 9C:
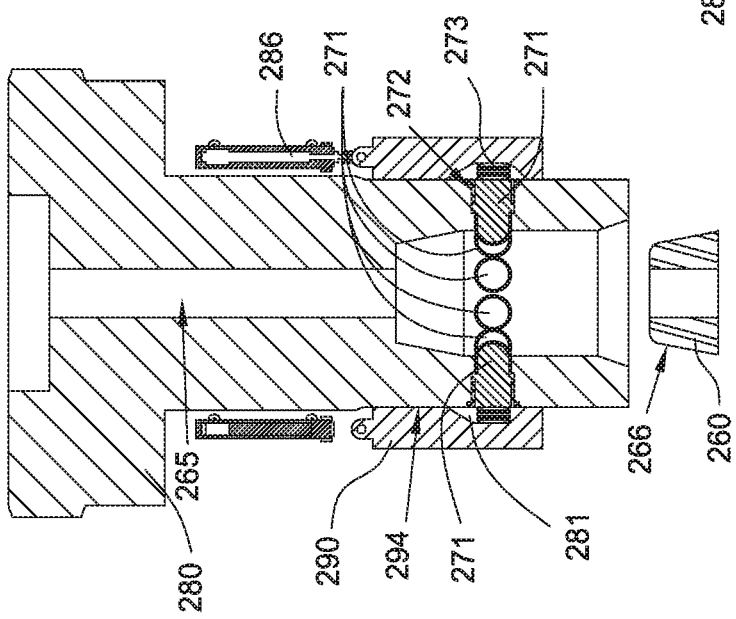

Coupling of drive unit 210 to tool adapter 250 may proceed as illustrated in FIG. 9C. Once coupling recesses 261 are in vertical alignment with ports 272, and sliding coupling members 271 are thereby mated with coupling recesses 261, sleeve 292 may be lowered relative to drive stem 280. Recessed surfaces 281 on the interior of sleeve 292 may be tapered so that moving coupling collar 290 to a lowered position may gradually slide sliding coupling members 271 and spring elements 273 into ports 272. Once coupling collar 290 is in the lowered position, actuation surfaces 294 of sleeve 292 may engage and/or compress spring elements 273 into ports 272. Actuators 286 may move coupling collar 290 into the lowered position. Actuators 286 may secure and/or lock coupling collar 290 in the lowered position. In the lowered position, coupling collar 290 may thereby secure sliding coupling members 271 in the extended position, mated with coupling recesses 261. The actuators 286 may provide an external, visual representation of the position of the coupling collar 290. When coupling collar 290 secures sliding coupling members 271 in the extended position, mated with coupling recesses 261, bi-directional torque may be transferred from motors 240 to drive stem 280, to ports 272 and through sliding coupling members 271, to coupling recesses 261 and tool stem 260, and thereby to tool adapter 250. It should be appreciated that rotation of top drive system 200 with coupling collar 290 in the raised position may result in outward displacement of sliding coupling members 271 due to centrifugal force.

De-coupling drive unit 210 from tool adapter 250 may proceed essentially in the reverse of the above-stated coupling steps. In some embodiments, with coupling collar 290 in the raised position, actuators (not shown) may slide sliding coupling members 271 outwardly (away from central axis 201) through ports 272. For example, electromagnetic actuators may remove sliding coupling members 271 from engagement with coupling recesses 261 on tool stem 260.

Figure 11:
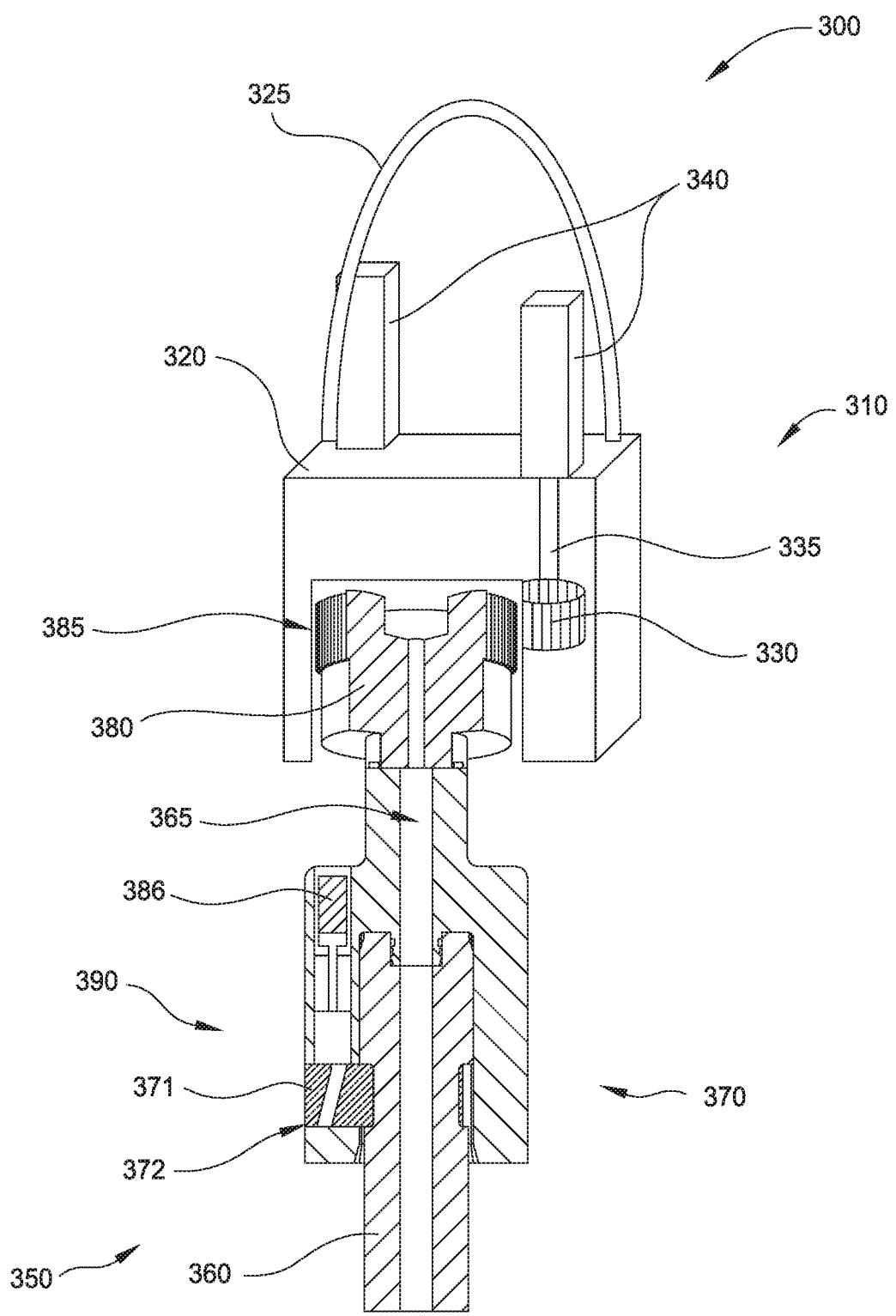
FIG. 11 illustrates an alternative top drive system of the drilling system of FIG. 1.

FIG. 11 illustrates an alternative top drive system 300 according to embodiments described herein. Except as noted, top drive system 300 is configured and functions similarly to top drive system 100 and top drive system 200. For example, top drive system 300 includes a drive unit 310 and a tool adapter 350. The drive unit 310 generally includes a housing 320, becket 325, drive gears 330, motors 340, first portions of one or more couplings 370, and a drive stem 380. Rather than tool stem sleeve 190 or coupling collar 290, drive unit 310 includes a vector transmission unit 390. The vector transmission unit 390 may include one or more actuators 386 coupled to one or more transmission members 392. The vector transmission unit 390 may be coupled to or housed within a wall of drive stem 380. The transmission members 392 of vector transmission unit 390 may be operationally coupled to sliding coupling members 371. Through vector transmission unit 390, actuators 386 may cause sliding coupling members 371 to move between a retracted position and an extended position in ports 372 of drive stem 380. The tool adapter 350 generally includes a tool stem 360 and second portions of the couplings 370. The tool stem 360 connects the top drive system 300 to the tool string 2. The tool stem 360 and drive stem 380 may share a central bore 365. When the drive unit 310 is coupled to the tool adapter 350, top drive system 300 may transfer bi-directional torque, load, power, data, and/or signals between the top drive and the tool.

Figure 12:
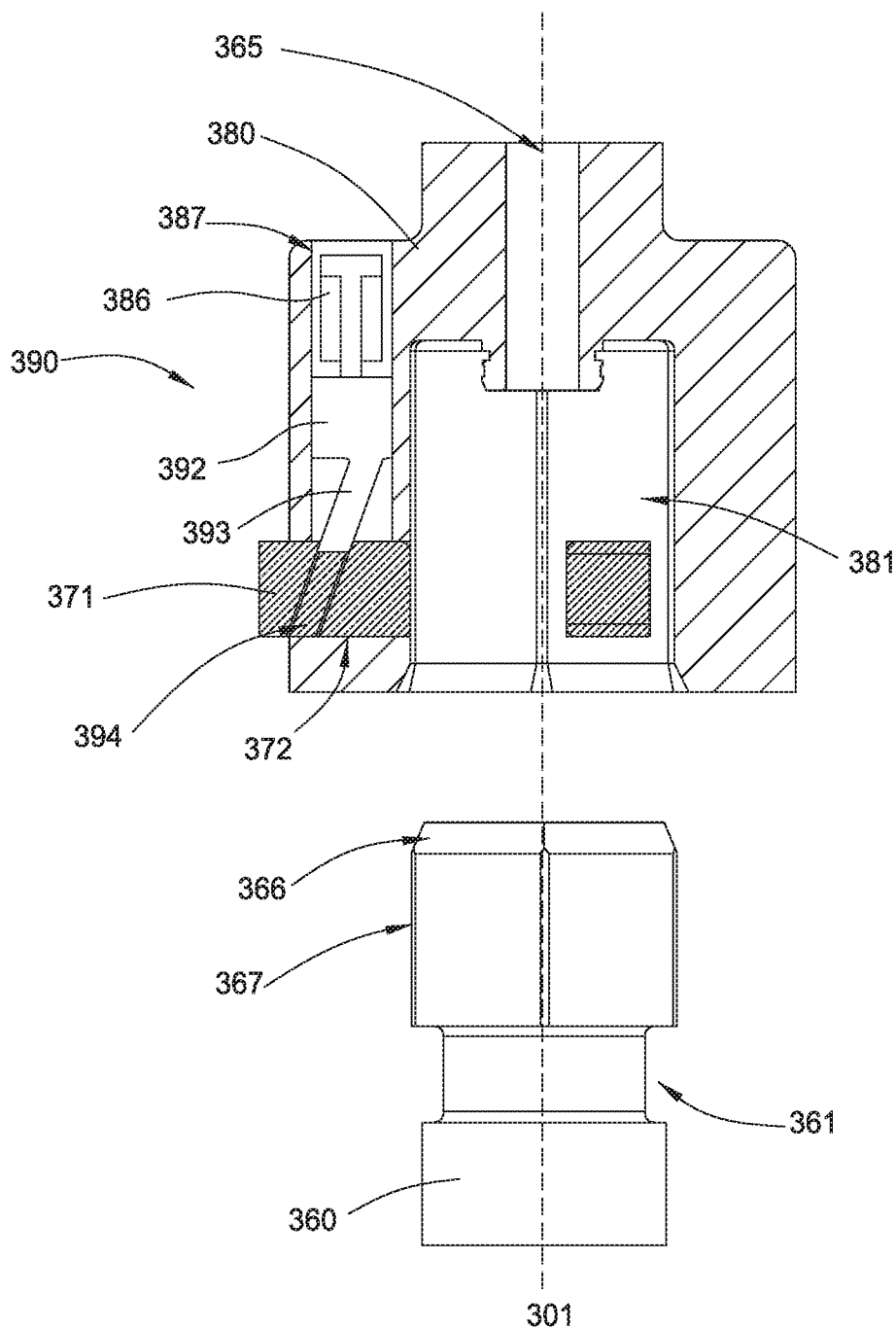
FIG. 12 illustrates a drive stem and a tool stem of the top drive system of FIG. 11.

Vector transmission unit 390 may actuate sliding coupling members 371 by producing linear force in a first direction and converting it to linear force in a second direction. As illustrated in FIG. 12, vector transmission unit 390 may produce linear force with one or more actuators 386. The actuators 386 may be pistons (e.g., hydraulic). Each actuator 386 may produce linear force in a vertical direction. Each actuator 386 may be operationally coupled to a transmission member 392. For example, actuator 386 may cause transmission member 392 to move vertically in recess 387. As illustrated in FIG. 12, the transmission member 392 may include an angled rod 393. The transmission member 392 may engage with sliding coupling member 371 and cause sliding coupling member 371 to slide inwardly (towards central axis 301) or outwardly (away from central axis 301). As illustrated, angled rod 393 of transmission member 392 may engage a transmission guide 394 of sliding coupling member 371. Downward force by actuator 386 may cause transmission member 392 to move downwardly through recess 387. Downward motion of transmission member 392 may cause angled rod 393 to move downwardly through transmission guide 394 of sliding coupling member 371. Since transmission member 392 is constrained to move vertically within recess 387, and since sliding coupling member 371 is constrained to move horizontally within port 372 of drive stem 380, downward motion of angled rod 393 through transmission guide 394 may cause inward motion of sliding coupling member 371. As illustrated, drive unit 310 includes three vector transmission units 390. As would be understood by one of ordinary skill in the art with the benefit of this disclosure, other quantities and configurations of vector transmission units 390 may be considered to accommodate manufacturing and operational conditions.

Also illustrated in FIG. 12, tool stem 360 may include a polygonal head 367 between tapered top end 366 and coupling recess 361. In some embodiments, the number of sides to polygonal head 367 may equal twice the number of sliding coupling members 371. In the illustrated embodiment, polygonal head 367 has six sides (i.e., hexagonal), and drive stem 380 has three sliding coupling members 371. Any number of sides of polygonal head 367 and/or sliding coupling members 371 may be considered to accommodate manufacturing and operational conditions. Drive stem 380 may have a coupling recess 381 that is sized and shaped to mate with tapered top end 366 and polygonal head 367 of tool stem 360.

Figure 13:
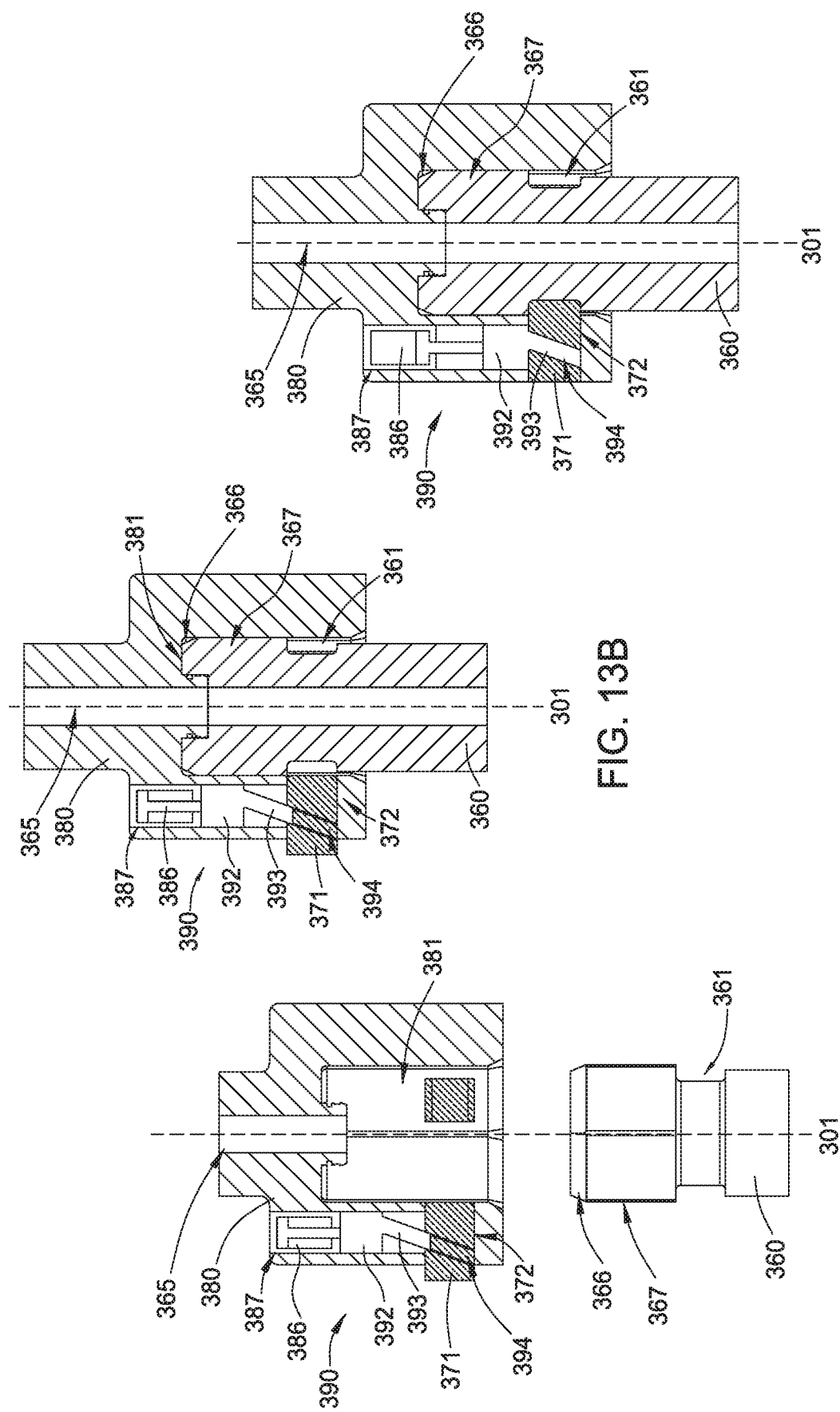
FIGS. 13A-13C illustrate a method of coupling the drive unit of FIG. 11 with the tool adapter of FIG. 11.

As before, coupling of drive unit 310 to tool adapter 350 may proceed as a multi-step process. In one embodiment, illustrated in FIGS. 13A-13B, the coupling begins with torque coupling between drive stem 380 and tool stem 360. Drive stem 380 may be aligned with tool stem 360 so that tool stem 360 may be stabbed into an interior of drive stem 380. Drive stem 380 may be rotated relative to tool stem 360 to align polygonal head 367 with coupling recess 381. For example, motors 340 may rotate drive stem 380 to align coupling recess 381 with polygonal head 367. Tool stem 360 may be stabbed into an interior of drive stem 380 until coupling recess 361 vertically align with ports 372 (FIG. 13B). Sliding coupling members 371 may be maintained in a retracted position while tool stem 360 is aligned with and stabbed into drive stem 380. For example, actuators 386 may cause vector transmission unit 390 to maintain sliding coupling members 371 in a retracted position in ports 372. Once polygonal head 367 mates with coupling recess 381, as shown in FIG. 13B, bi-directional torque may be transferred between the top drive and the tool. For example, torque may be transferred from the motors 340 through shaft 335 to the drive gears 330, to the drive stem 380, through the coupling recess 381 to the polygonal head 367, to tool stem 160, and to the tool string 2. Bi-directional torque may be thereby transferred from the motors 340 of the drive unit 310 to the tool stem 360, and thus to the tool string 2.

Coupling of drive unit 310 to tool adapter 350 may proceed with axial load coupling between drive stem 380 and tool stem 360, as illustrated in FIGS. 13B-13C. Vector transmission unit 390 may actuate sliding coupling members 371 to slide inwardly to an extended position by producing linear force in a first direction and converting it to linear force in a second direction. For example, actuators 386 may exert vertical force on transmission members 392, which may then exert horizontal force on sliding coupling members 371. Sliding coupling member 371 may slide inwardly (towards central axis 301) in ports 372 of drive stem 380. Sliding coupling members 371 may engage and/or mate with coupling recess 361 of tool stem 360. Actuators 386 may secure and/or lock sliding coupling members 371 in the extended position. When sliding coupling members 371 are in the extended position, axial load may be transferred from tool stem 360 through polygonal head 367 to sliding coupling members 371, to ports 372 and drive stem 380, and thereby to drive unit 310.

Figure 14:
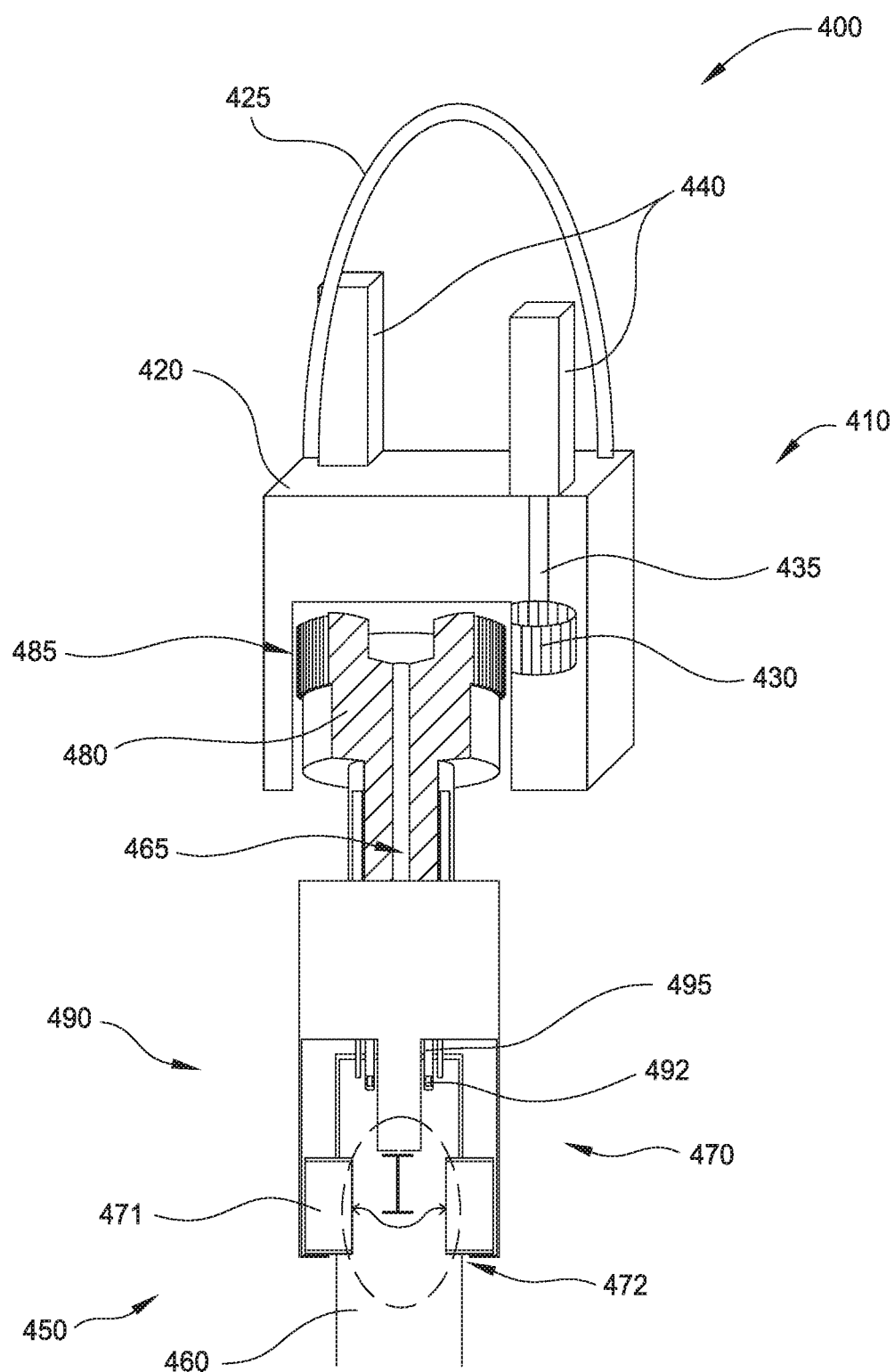
FIG. 14 illustrates an alternative top drive system of the drilling system of FIG. 1.

FIG. 14 illustrates an alternative top drive system 400 according to embodiments described herein. Except as noted, top drive system 400 is configured and functions similarly to top drive system 100, top drive system 200, and top drive system 300. For example, top drive system 400 includes a drive unit 410 and a tool adapter 450. The drive unit 410 generally includes a housing 420, becket 425, drive gears 430, motors 440, first portions of one or more couplings 470, a drive stem 480, and drive torque profile 495. The tool adapter 450 generally includes a tool stem 460, second portions of the couplings 470, sliding coupling members 471, and tool torque profile 492. Rather than tool stem sleeve 190, coupling collar 290, or vector transmission unit 390, top drive system 400 includes a hydraulic coupling unit 490. First portions of hydraulic coupling unit 490 may be coupled to or housed within a wall of drive stem 480, and second portions of hydraulic coupling unit 490 may be coupled to or housed within a wall of tool stem 460. Tool stem 460 may stab into an interior of drive stem 480. Hydraulic coupling unit 490 may cause sliding coupling members 471 to move between a retracted position and an extended position in ports 472 of tool stem 460. With sliding coupling members 471 in the extended position, axial load may be transferred from the tool stem 460 to the drive stem 480. The tool stem 460 connects the top drive system 400 to the tool string 2. The tool stem 460 and drive stem 480 may share a central bore 465. Hydraulic coupling unit 490 may encircle central bore 465. When the drive unit 410 is coupled to the tool adapter 450, top drive system 400 may transfer bi-directional torque, load, power, data, and/or signals between the top drive and the tool.

Figure 15:
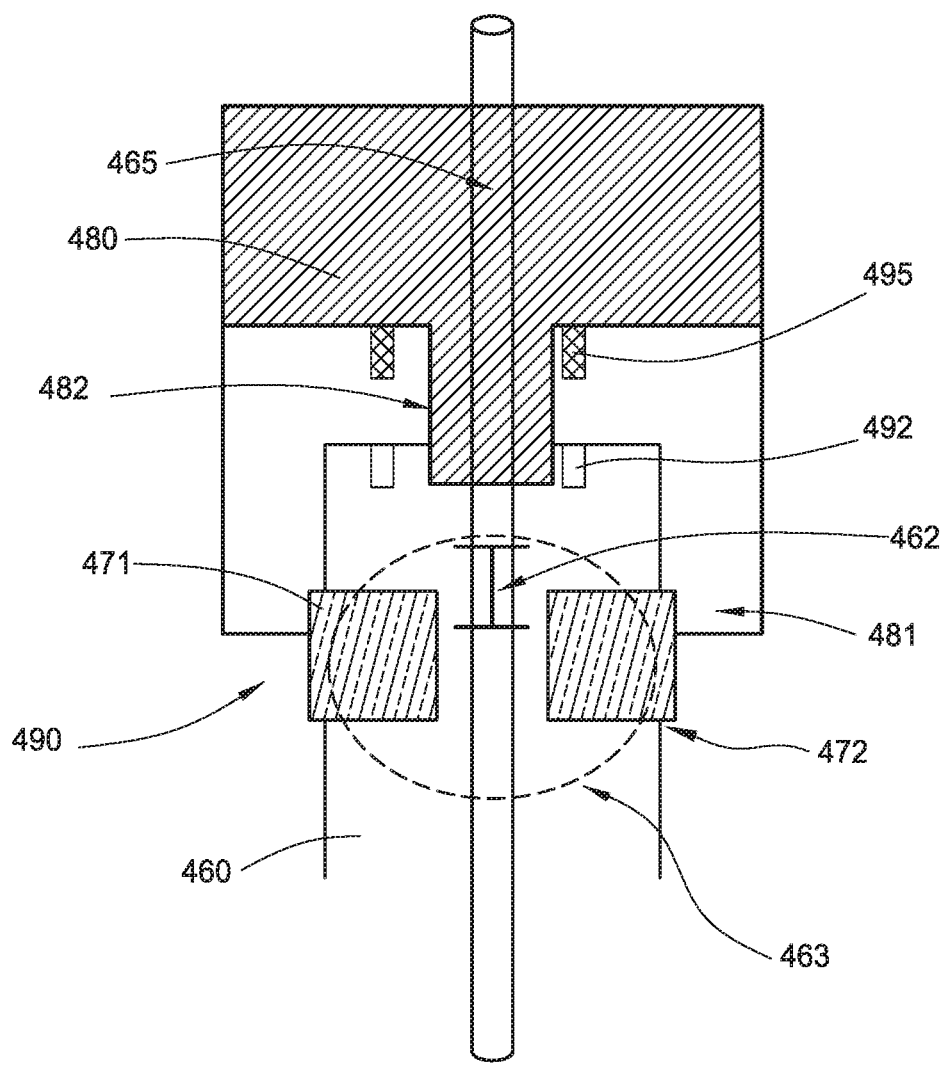
FIG. 15 illustrates a drive stem and a tool stem of the top drive system of FIG. 14.

Similar to torque profile 195, drive torque profile 495 may be an axially symmetrical or axially non-symmetrical profile capable of conveying torque around central bore 465. For example, as illustrated in FIG. 15, drive torque profile 495 may be a plurality (e.g., two) of pins distributed axially symmetrically around central bore 465 on drive stem 480. Similar to sleeve torque profile 192, tool torque profile 492 may be configured to engage and/or mate with drive torque profile 495 of drive stem 480. Tool torque profile 492 may be an axially symmetrical or axially non-symmetrical profile capable of conveying torque around central bore 465. For example, as illustrated, tool torque profile 492 may be a plurality (e.g., two) of pin holes distributed axially symmetrically around central bore 465 of tool stem 460. Tool torque profile 492 may engage drive torque profile 495 when tool stem 460 is stabbed into an interior of drive stem 480 to couple drive unit 410 to tool adapter 450. For example, drive stem 480 may turn drive torque profile 495, which engages tool torque profile 492, thereby turning tool stem 460.

Sliding coupling members 471 in ports 472 may be distributed axially symmetrically or axially non-symmetrically on tool stem 460. Sliding coupling members 471 in ports 472 may be distributed symmetrically or non-symmetrically along an axial length of tool stem 460. Sliding coupling members 471 may be at least partially movable into and out of coupling recesses 481 on drive stem 480 when tool stem 460 is stabbed into an interior of drive stem 480. The sliding coupling members 471 may be sized and shaped identically, similarly, or non-similarly. Each coupling recess 481 may be sized and shaped to allow its respective sliding coupling member 471 to move at least partially into and out of the coupling recess 481.

Hydraulic coupling unit 490 may actuate sliding coupling members 471 by producing a control signal, such as a hydraulic impulse. As illustrated in FIG. 15, hydraulic coupling unit 490 may include a plunger 482 on drive stem 480 and a cylinder 462 on tool stem 460. The plunger 482 and cylinder 462 may be located, sized, and/or configured to operably engage to actuate a hydraulic impulse. For example, plunger 482 and cylinder 462 may each encircle central bore 465, or plunger 482 and cylinder 462 may each be disposed within central bore 465. The hydraulic impulse may cause hydraulic transmission 463 on tool stem 460 to move sliding coupling members 471 between a retracted and an extended position in ports 472. As would be understood by one of ordinary skill in the art with the benefit of this disclosure, other configurations of hydraulic coupling unit 490 may be considered to accommodate manufacturing and operational conditions.

As before, coupling of drive unit 410 to tool adapter 450 may proceed as a multi-step process. In one embodiment, illustrated in FIGS. 16A-16B, the coupling begins with torque coupling between drive stem 480 and tool stem 460. Drive stem 480 may be aligned with tool stem 460 so that tool stem 460 may be stabbed into an interior of drive stem 480. Drive stem 480 may be rotated relative to tool stem 460 to align drive torque profile 495 with tool torque profile 492. For example, motors 440 may rotate drive stem 480 to align drive torque profile 495 with tool torque profile 492. Tool stem 460 may be stabbed into an interior of drive stem 480 until coupling recesses 481 vertically align with ports 472 (FIG. 16B). Sliding coupling members 471 may be maintained in a retracted position while tool stem 460 is aligned with and stabbed into drive stem 480. Once drive torque profile 495 mates with tool torque profile 492, as shown in FIG. 16B, bi-directional torque may be transferred between the top drive and the tool. For example, torque may be transferred from the motors 440 through shaft 435 to the drive gears 430, to the drive stem 480, through drive torque profile 495 to tool torque profile 492, to tool stem 460, and to the tool string 2. Bi-directional torque may be thereby transferred from the motors 440 of the drive unit 410 to the tool stem 460, and thus to the tool string 2.

Figure 16C:
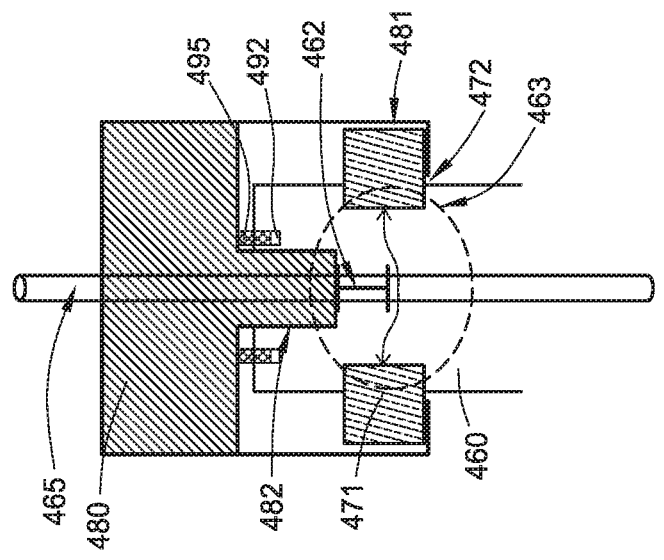
FIGS. 16A-16C illustrate a method of coupling the drive unit of FIG. 14 with the tool adapter of FIG. 14.
Figure 16B:
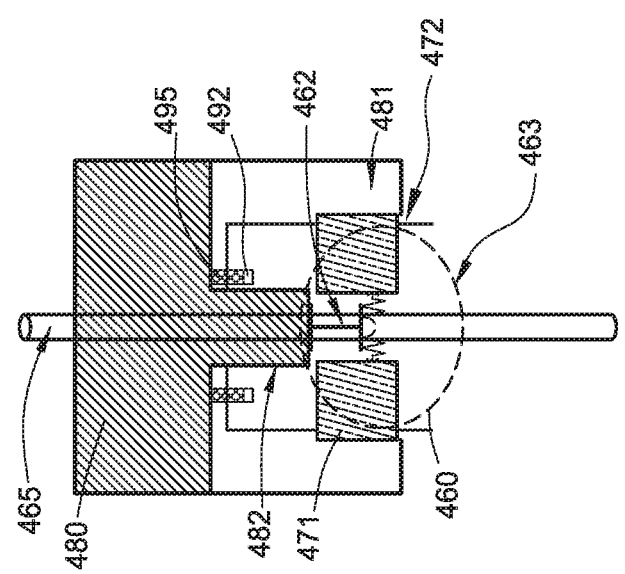
Figure 16A:
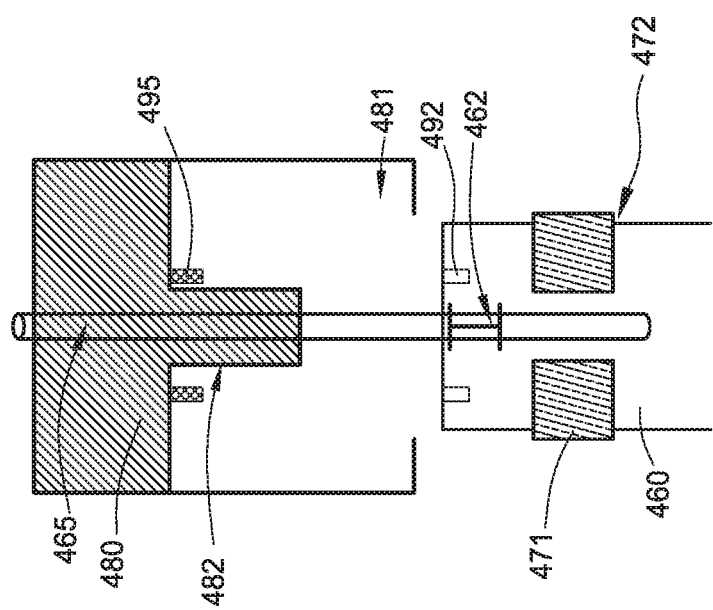

Coupling of drive unit 410 to tool adapter 450 may proceed with axial load coupling between drive stem 480 and tool stem 460, as illustrated in FIGS. 16B-16C. After coupling recesses 481 are vertically aligned with ports 472, hydraulic coupling unit 490 may actuate sliding coupling members 471 to slide outwardly to an extended position by producing a hydraulic impulse. Plunger 482 may operably engage cylinder 462 to actuate the hydraulic impulse. The hydraulic impulse may cause hydraulic transmission 463 on tool stem 460 to move sliding coupling members 471 outwardly in ports 472 to an extended position. The sliding coupling members 471 may move at least partially into coupling recesses 481. Sliding coupling members 471 may engage and/or mate with coupling recesses 481 of drive stem 480. By maintaining pressure on cylinder 462, plunger 482 may secure and/or lock sliding coupling members 471 in the extended position. When sliding coupling members 471 are in the extended position, axial load may be transferred from tool stem 460 through ports 472 to sliding coupling members 471, to coupling recesses 481 and drive stem 480, and thereby to drive unit 410.

De-coupling drive unit 410 from tool adapter 450 may proceed essentially in the reverse of the above-stated coupling steps. In some embodiments, hydraulic coupling unit 490 may generate a second control signal to cause sliding coupling members 471 to slide inwardly through ports 472. For example, plunger 482 may provide a second hydraulic impulse to cylinder 462. The second hydraulic impulse may cause hydraulic transmission 463 on tool stem 460 to move sliding coupling members 471 to a retracted in ports 472.

Figure 17:
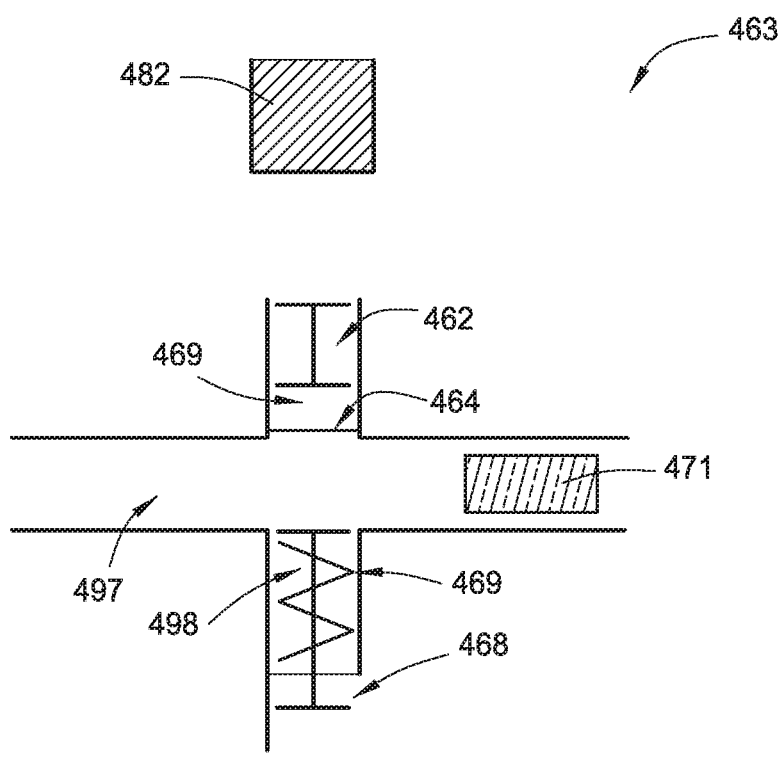
FIG. 17 further illustrates the drive stem and the tool stem of the top drive system of FIG. 14.

An example of the functioning of hydraulic transmission 463 of hydraulic coupling unit 490 is illustrated in FIG. 17. Initially, hydraulic fluid may be in upper reservoir 496 and middle reservoir 497. Upper reservoir 496 may be in fluid communication with cylinder 462 and valve 464, which may be initially closed. Sliding coupling members 471 may be in a retracted position and in fluid communication with middle reservoir 497. Reservoir cylinder 468 may close lower reservoir 498, for example by the action of reservoir spring 469. Hydraulic coupling unit 490 may actuate a control signal by engaging cylinder 462 with plunger 482. The control signal may be a hydraulic signal, such as a hydraulic impulse of a certain amplitude, duration, or both. The control signal may cause valve 464 to open. Pressure of plunger 482 on cylinder 462 may be transferred to hydraulic fluid in upper reservoir 496 and middle reservoir 497. Hydraulic pressure in the middle reservoir may apply a force to sliding coupling members 471. Plunger 482 may thereby move sliding coupling members 471 to an extended position. A second control signal may cause reservoir cylinder 468 to retract against the force of reservoir spring 469. Hydraulic fluid may flow from middle reservoir 497 to lower reservoir 498. Reduced pressure in middle reservoir 497 may move sliding coupling members 471 to a retracted position. A third control signal may release the retraction of reservoir cylinder 468. Reservoir spring 469 may then cause reservoir cylinder 468 to close lower reservoir 498, forcing hydraulic fluid back into upper reservoir 496. Valve 464 may close in response to the fluid return, or a forth control signal may close valve 464, returning the hydraulic transmission 463 to its initial arrangement.

It should be understood that the components of tool couplers described herein could be usefully implemented in reverse configurations. For example, FIGS. 3A-3B illustrate drive stem 180 (having sliding coupling members 171) of drive unit 110 stabbing into tool stem sleeve 190 of tool adapter 150. A similarly useful configuration would include a tool stem (having sliding coupling members 171) of tool adapter 150 stabbing into a drive stem sleeve of drive unit 110.

It should be appreciated that, for each top drive system 100, 200, 300, 400, a variety of sensors, actuators, and/or adapters types and/or configurations may be considered to accommodate manufacturing and operational conditions. The actuators may be, for example, worm drives, hydraulic cylinders, compensation cylinders, etc. The actuators may be hydraulically, pneumatically, electrically, and/or manually controlled. In some embodiments, multiple control mechanism may be utilized to provide redundancy. One or more sensors may be used to monitor relative positions of the components of the top drive system. The sensors may be position sensors, rotation sensors, pressure sensors, optical sensors, magnetic sensors, etc. In some embodiments, stop surfaces may be used in conjunction with or in lieu of sensors to identify when components are appropriately positioned and/or oriented. Likewise, optical guides may be utilized to identify or confirm when components are appropriately positioned and/or oriented. In some embodiments, guide elements (e.g., pins and holes, chamfers, etc.) may assist in aligning and/or orienting the components of each top drive system 100, 200, 300, 400. Bearings and seals may be disposed between components to provide support, cushioning, rotational freedom, and/or fluid management.

In an embodiment, a top drive system includes a drive unit having a drive stem; a plurality of sliding coupling members disposed on an exterior of the drive stem; a retainer to retain the plurality of sliding coupling members on the drive stem; and a torque profile on the drive stem. The top drive system also includes a tool adapter having a tool stem having a tool stem sleeve, wherein the drive stem extends through an interior of the tool stem sleeve; a plurality of coupling recesses on an interior of the tool stem sleeve and engagable with the sliding coupling members; and a sleeve torque profile engagable with the torque profile.

In one or more embodiments disclosed herein, the top drive system also includes a load coupling comprising engagement of the sliding coupling members with the coupling recesses on the tool stem sleeve.

In one or more embodiments disclosed herein, the top drive system also includes a torque coupling comprising engagement of the torque profile with the sleeve torque profile.

In one or more embodiments disclosed herein, the torque profile is a plurality of lugs distributed around a central bore of the drive stem.

In one or more embodiments disclosed herein, the torque profile has a radial extent at least as wide as the tool stem sleeve.

In one or more embodiments disclosed herein, each sliding coupling member is at least partially disposed in a coupling recess on the drive stem.

In one or more embodiments disclosed herein, the top drive system also includes a piston coupled to the retainer, wherein movement of the piston causes the sliding coupling members to move between an extended position and a retracted position.

In one or more embodiments disclosed herein, the top drive system also includes a recess on the drive stem for each sliding coupling member, wherein each sliding coupling member is partially disposed in its respective recess on the drive stem when in the retracted position.

In one or more embodiments disclosed herein, each sliding coupling member is partially disposed in one of the coupling recesses on the tool stem sleeve when in the extended position.

In one or more embodiments disclosed herein, the top drive system also includes a first coupling bracket on the torque profile and a second coupling bracket on the sleeve torque profile.

In one or more embodiments disclosed herein, the top drive system also includes at least one coupling between the drive unit and the tool adapter selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment, a method of coupling a drive unit to a tool adapter includes positioning the tool adapter below the drive unit; stabbing a drive stem of the drive unit into an interior of a tool stem sleeve of the tool adapter; coupling a torque between the drive unit and the tool adapter by engaging a torque profile of the drive stem with a sleeve torque profile of the tool stem sleeve; and coupling a load between the drive unit and the tool adapter by engaging a plurality of sliding coupling members on the drive stem with a plurality of coupling recesses on the interior of the tool stem sleeve.

In one or more embodiments disclosed herein, coupling the load comprises moving the sliding coupling members from a retracted position to an extended position.

In one or more embodiments disclosed herein, coupling the load further comprises moving a piston from an upper position to a lower position to move the sliding coupling members from the retracted position to the extended position.

In one or more embodiments disclosed herein, the method also includes securing the sliding coupling members in the extended position.

In one or more embodiments disclosed herein, the method also includes aligning the torque profile with the sleeve torque profile before stabbing the drive stem into to the interior of the tool stem sleeve.

In one or more embodiments disclosed herein, the method also includes aligning the sliding coupling members with the coupling recesses on the tool stem sleeve before stabbing the drive stem into to the interior of the tool stem sleeve.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment, a drive unit of a top drive system includes a drive stem having a plurality of ports from an exterior thereof to an interior thereof; a plurality of sliding coupling members disposed in the ports; and a coupling collar encircling the drive stem and having actuation surfaces and recessed surfaces on an interior thereof, wherein the recessed surfaces align with the ports when the coupling collar is in a first position, and the actuation surfaces align with the ports when the coupling collar is in a second position.

In one or more embodiments disclosed herein, the ports prevent the sliding coupling members from fully entering into the interior of the drive stem.

In one or more embodiments disclosed herein, a radial depth of the recessed surfaces may be at least as large as a radial depth of the actuation surfaces.

In one or more embodiments disclosed herein, the first position is a raised position.

In one or more embodiments disclosed herein, the drive unit also includes spring elements between the sliding coupling members and the coupling collar.

In one or more embodiments disclosed herein, the drive unit also includes actuators to move the coupling collar relative to the drive stem between the first position and the second position.

In one or more embodiments disclosed herein, the top drive system also includes a tool stem having coupling recesses engagable with the sliding coupling members.

In one or more embodiments disclosed herein, the top drive system also includes a load coupling comprising engagement of the sliding coupling members with the coupling recesses.

In one or more embodiments disclosed herein, the top drive system also includes a torque coupling comprising engagement of the sliding coupling members with the coupling recesses.

In one or more embodiments disclosed herein, the tool stem has a tapered top end.

In one or more embodiments disclosed herein, a number of the coupling recesses exceeds a number of the ports.

In an embodiment, a method of coupling a drive unit to a tool adapter includes positioning the tool adapter below the drive unit; stabbing a tool stem of the tool adapter into an interior of a drive stem of the drive unit; engaging coupling recesses of the tool stem with sliding coupling members of the drive stem by moving the sliding coupling members to an extended position; and securing the sliding coupling members in the extended position.

In one or more embodiments disclosed herein, the method also includes coupling a torque between the drive unit and the tool adapter by engaging the coupling recesses with the sliding coupling members; and coupling a load between the drive unit and the tool adapter by engaging the coupling recesses with the sliding coupling members.

In one or more embodiments disclosed herein, engaging the coupling recesses with the sliding coupling members comprises moving a coupling collar from a raised position to a lowered position.

In one or more embodiments disclosed herein, the method also includes holding the coupling collar in the raised position while stabbing the tool stem into the interior of the drive stem.

In one or more embodiments disclosed herein, securing the sliding coupling members in the extended position comprises securing a coupling collar in a lowered position.

In one or more embodiments disclosed herein, stabbing the tool stem into the interior of the drive stem comprises engaging a tapered top end of the tool stem with the sliding coupling members.

In one or more embodiments disclosed herein, the sliding coupling members are disposed in ports on the drive stem, the method further comprising aligning the coupling recesses with the ports before stabbing the tool stem into to the interior of the drive stem.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment, a drive unit of a top drive system includes a drive stem having a coupling recess; a plurality of ports in the drive stem connected to the coupling recess; a plurality of sliding coupling members movable between a retracted position and an extended position in the ports; and a plurality of transmission units operationally coupled to the sliding coupling members to move the sliding coupling members between the retracted position and the extended position.

In one or more embodiments disclosed herein, each transmission unit comprises an actuator capable of producing linear force in a first direction, wherein the first direction is orthogonal to the ports of the drive stem.

In one or more embodiments disclosed herein, each transmission unit further comprises a transmission member capable of converting the linear force in the first direction to a linear force in a second direction parallel to the ports of the drive stem.

In one or more embodiments disclosed herein, the transmission member comprises an angled rod that engages a transmission guide of the sliding coupling member.

In one or more embodiments disclosed herein, each transmission unit is housed within a wall of the drive stem.

In one or more embodiments disclosed herein, the top drive system also includes a tool stem, wherein: the tool stem has a polygonal head configured to mate with the coupling recess of the drive stem; and the tool stem has a coupling recess engagable with the sliding coupling members.

In one or more embodiments disclosed herein, the top drive system also includes a load coupling comprising engagement of the sliding coupling members with the coupling recess of the tool stem.

In one or more embodiments disclosed herein, the top drive system also includes a torque coupling comprising mating of the polygonal head with the coupling recess of the drive stem.

In one or more embodiments disclosed herein, the tool stem has a tapered top end.

In an embodiment, a method of coupling a drive unit to a tool adapter includes positioning the tool adapter below the drive unit; stabbing a tool stem of the tool adapter into an interior of a drive stem of the drive unit; mating a polygonal head of the tool stem with a coupling recess of the drive stem; and engaging coupling recesses of the tool stem with sliding coupling members of the drive stem by moving the sliding coupling members to an extended position.

In one or more embodiments disclosed herein, the method also includes coupling a torque between the drive unit and the tool adapter by mating the polygonal head with the coupling recesses of the drive stem; and coupling a load between the drive unit and the tool adapter by engaging the coupling recesses of the tool stem with the sliding coupling members.

In one or more embodiments disclosed herein, the method also includes aligning the polygonal head with the coupling recess of the drive stem before stabbing the tool stem into to the interior of the drive stem.

In one or more embodiments disclosed herein, the method also includes maintaining the sliding coupling members in a retracted position while stabbing the tool stem into the interior of the drive stem.

In one or more embodiments disclosed herein, the method also includes exerting vertical force on transmission members with actuators; and exerting horizontal force on the sliding coupling members with the transmission members.

In one or more embodiments disclosed herein, engaging the coupling recess of the tool stem with the sliding coupling members comprises moving the sliding coupling members to an extended position.

In one or more embodiments disclosed herein, the method also includes securing the sliding coupling members in the extended position.

In an embodiment, a top drive system includes a drive unit having a drive stem; a plurality of coupling recesses on an interior of the drive stem; a drive torque profile on the drive stem; and first portions of a hydraulic coupling unit. The top drive system also includes a tool adapter having a tool stem, wherein the tool stem extends through an interior of the drive stem; a plurality of sliding coupling members disposed on an exterior of the tool stem and engagable with the coupling recesses on the drive stem; a tool torque profile on the tool stem and engagable with the drive torque profile; and second portions of the hydraulic coupling unit.

In one or more embodiments disclosed herein, the top drive system also includes a load coupling comprising engagement of the sliding coupling members with the coupling recesses on the drive stem.

In one or more embodiments disclosed herein, the top drive system also includes a torque coupling comprising engagement of the drive torque profile with the tool torque profile.

In one or more embodiments disclosed herein, the hydraulic coupling unit causes the sliding coupling members to move between a retracted position and an extended position in ports of the tool stem.

In one or more embodiments disclosed herein, each sliding coupling member is at least partially disposed in a coupling recess on the tool stem when in the extended position.

In one or more embodiments disclosed herein, the first portions of the hydraulic coupling unit encircle a central bore of the drive stem.

In one or more embodiments disclosed herein, the drive torque profile comprises a plurality of pins, and the tool torque profile comprises a plurality of holes.

In one or more embodiments disclosed herein, the first portions of the hydraulic coupling unit comprise a plunger, and the second portions of the hydraulic coupling unit comprise a cylinder.

In one or more embodiments disclosed herein, the second portions of the hydraulic coupling unit further comprising an upper reservoir, a middle reservoir, a lower reservoir, a valve between the upper reservoir and the middle reservoir, and a lower cylinder in the lower reservoir.

In an embodiment, a method of coupling a drive unit to a tool adapter includes positioning the tool adapter below the drive unit; stabbing a tool stem of the tool adapter into an interior of a drive stem of the drive unit; coupling a torque between the drive unit and the tool adapter by engaging a drive torque profile of the drive stem with a tool torque profile of the tool stem; and coupling a load between the drive unit and the tool adapter by: producing a control signal; responding to the control signal by moving sliding coupling members on the tool stem to an extended position; and engaging the sliding coupling members in the extended position with coupling recesses on the interior of the drive stem.

In one or more embodiments disclosed herein, the control signal is a hydraulic impulse.

In one or more embodiments disclosed herein, the method also includes aligning the drive torque profile with the tool torque profile before stabbing the tool stem into to the interior of the drive stem.

In one or more embodiments disclosed herein, the method also includes maintaining the sliding coupling members in a retracted position while stabbing the tool stem into the interior of the drive stem.

In one or more embodiments disclosed herein, producing the control signal comprises engaging a plunger of the drive stem with a cylinder of the tool stem.

In one or more embodiments disclosed herein, the method also includes securing the sliding coupling members in the extended position.

In one or more embodiments disclosed herein, moving the sliding coupling members to an extended position comprises: opening a valve between an upper reservoir and a middle reservoir on the tool stem; transferring hydraulic pressure from the upper reservoir to the middle reservoir; and applying a force to the sliding coupling members with the hydraulic pressure in the middle reservoir.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

While the foregoing is directed to embodiments of the present invention, other and further embodiments of the invention may be devised without departing from the basic scope thereof, and the scope thereof is determined by the claims that follow.

The invention claimed is:
1. A top drive system comprising:
 a drive unit comprising:
  a drive stem;
  a drive gear profile disposed on an exterior surface of the drive stem;
  a plurality of sliding coupling members disposed on an exterior of the drive stem;
  a retainer sleeve to retain the plurality of sliding coupling members on the drive stem, the retainer sleeve disposed around the exterior of the drive stem and movable relative to the drive stem;
  a first bracket for securing a first portion of a coupling; and
  a torque profile on the drive stem; and
 a tool adapter comprising:
  a tool stem having a tool stem sleeve, wherein the tool stem sleeve;
  a plurality of coupling recesses on an interior of the tool stem sleeve and engagable with the sliding coupling members;
  a second bracket for securing a second portion of the coupling, wherein the first portion is configured to engage the second portion of the coupling; and
 a sleeve torque profile positioned at a free end of the sleeve to engage with the torque profile.

2. The top drive system of claim 1, wherein each sliding coupling member is at least partially disposed in a coupling recess on the drive stem.

3. The top drive system of claim 1, further comprising a piston coupled to the retainer sleeve, wherein movement of the piston causes the sliding coupling members to move between an extended position and a retracted position.

4. The top drive system of claim 3, further comprising a recess on the drive stem for each sliding coupling member, wherein each sliding coupling member is partially disposed in its respective recess on the drive stem when in the retracted position.

5. The top drive system of claim 1, wherein the torque profile is a plurality of lugs distributed around a central bore of the drive stem.

6. The top drive system of claim 1, wherein the retainer is axially movable relative to the drive stem.

7. The top drive system of claim 1, wherein the drive gear profile is configured to transfer torque to the drive stem.

8. A method of coupling a drive unit to a tool adapter comprising:
   positioning a tool stem sleeve of the tool adapter below a drive stem of the drive unit;
   stabbing the drive stem of the drive unit into an interior of the tool stem sleeve of the tool adapter;
   engaging a torque profile of the drive stem with a sleeve torque profile positioned at a free end of the tool stem sleeve;
   engaging a first portion of a coupling secured to the drive stem using a first bracket with a second portion of the coupling secured to the tool stem sleeve using a second bracket; and
   engaging a plurality of sliding coupling members on the drive stem with a plurality of coupling recesses on the interior of the tool stem sleeve, wherein a retainer sleeve disposed around the exterior of the drive stem is used to move the plurality of sliding coupling members into engagement.

9. The method of claim 8, wherein engaging the plurality of sliding coupling members comprises moving the sliding coupling members from a retracted position to an extended position.

10. The method of claim 9, wherein engaging the plurality of sliding coupling members further comprises moving a piston from an upper position to a lower position to move the sliding coupling members from the retracted position to the extended position.

11. The method of claim 8, further comprising aligning the sliding coupling members with the coupling recesses on the tool stem sleeve before stabbing the drive stem into to the interior of the tool stem sleeve.

12. The method of claim 8, further comprising aligning the torque profile with the sleeve torque profile before stabbing the drive stem into to the interior of the tool stem sleeve.

* * * * *